US010223458B1

(12) United States Patent
Decker et al.

(10) Patent No.: US 10,223,458 B1
(45) Date of Patent: Mar. 5, 2019

(54) AUTOMATIC MAGAZINE GENERATOR FOR WEB CONTENT

(71) Applicant: Amazon Technologies, Inc., Reno, NV (US)

(72) Inventors: Kevin Decker, Woodinville, WA (US); Peter Frank Hill, Seattle, WA (US); Saral Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 14/487,849

(22) Filed: Sep. 16, 2014

(51) Int. Cl.
*G06F 15/02* (2006.01)
*G06F 17/30* (2006.01)
*H04N 21/466* (2011.01)

(52) U.S. Cl.
CPC .... *G06F 17/30867* (2013.01); *G06F 15/0291* (2013.01); *H04N 21/4668* (2013.01)

(58) Field of Classification Search
CPC .............. G06F 17/30867; H04N 21/4668
See application file for complete search history.

(56) References Cited

U.S. PATENT DOCUMENTS

| | | | | |
|---|---|---|---|---|
| 5,697,793 A * | 12/1997 | Huffman | ............. | G06F 15/0283 434/156 |
| 7,007,067 B1 * | 2/2006 | Azvine | .................. | G06F 3/011 709/202 |
| 7,707,602 B2 * | 4/2010 | Cragun | ............. | H04N 7/17318 348/460 |
| 7,937,725 B1 * | 5/2011 | Schaffer | ................. | H04N 7/163 725/26 |
| 7,984,056 B1 * | 7/2011 | Kane | ...................... | G06Q 30/02 707/749 |
| 8,527,525 B2 * | 9/2013 | Fong | ................. | G06F 17/30867 707/751 |
| 8,589,418 B1 * | 11/2013 | Kane | ...................... | G06Q 30/02 707/749 |
| 8,834,166 B1 * | 9/2014 | Ionkov | ............. | G06F 17/30595 434/178 |
| 9,055,115 B2 * | 6/2015 | Bell | ........................ | H04L 67/22 |
| 9,069,332 B1 * | 6/2015 | Gayles | .................... | G04F 10/00 |
| 9,098,407 B2 * | 8/2015 | Cho | .................... | G06F 15/0291 |
| 9,326,116 B2 * | 4/2016 | Kandekar | .......... | G06Q 30/0214 |
| 9,710,469 B2 * | 7/2017 | Chen | ................. | G06F 17/30023 |
| 2003/0126136 A1 * | 7/2003 | Omoigui | ............. | G06F 17/3089 |
| 2003/0126606 A1 * | 7/2003 | Buczak | .................. | H04N 7/163 725/46 |
| 2005/0183121 A1 * | 8/2005 | Kim | .................. | G06F 17/30029 725/46 |
| 2006/0195461 A1 * | 8/2006 | Lo | ...................... | G06F 17/30011 |

(Continued)

*Primary Examiner* — Scott T Baderman
*Assistant Examiner* — Benjamin Smith
(74) *Attorney, Agent, or Firm* — Klarquist Sparkman, LLP

(57) ABSTRACT

Techniques and solutions for provided for generating web content magazines. For example, a web content magazine can be generated by obtaining a user-specific interest model for a particular user, determining a reading time period, obtain web content that can be read by the user within the reading time period, processing the obtained web content to generate a web content magazine, and providing the web content magazine for display. The web content magazine can contain an amount of content that can be read by the user within the reading time period according to the user's reading speed.

20 Claims, 20 Drawing Sheets

(56) References Cited

U.S. PATENT DOCUMENTS

| | | | |
|---|---|---|---|
| 2007/0162846 A1* | 7/2007 | Cave | G06F 17/3089 715/210 |
| 2007/0255811 A1* | 11/2007 | Pettit | G06F 17/30905 709/220 |
| 2008/0010337 A1* | 1/2008 | Hayes | G06Q 10/00 709/202 |
| 2009/0077141 A1* | 3/2009 | Hady | G06F 17/30126 |
| 2009/0158342 A1* | 6/2009 | Mercer | G06Q 30/02 725/46 |
| 2009/0164408 A1* | 6/2009 | Grigorik | G06F 17/30867 |
| 2009/0327341 A1* | 12/2009 | Fong | G06F 17/30528 |
| 2010/0094878 A1* | 4/2010 | Soroca | G06F 17/30035 707/748 |
| 2010/0131455 A1* | 5/2010 | Logan | G06F 17/30905 707/602 |
| 2010/0205169 A1* | 8/2010 | Narayan | G06F 17/3089 707/711 |
| 2010/0293453 A1* | 11/2010 | Schwarz | G06F 17/30867 715/234 |
| 2010/0306023 A1* | 12/2010 | Grigoroscuta | G06Q 30/02 705/14.54 |
| 2011/0050591 A1* | 3/2011 | Kim | G06F 3/0488 345/173 |
| 2011/0050594 A1* | 3/2011 | Kim | G06F 3/04847 345/173 |
| 2011/0246182 A1* | 10/2011 | Allen | G06F 17/248 704/9 |
| 2012/0078612 A1* | 3/2012 | Kandekar | G06F 17/2745 704/9 |
| 2012/0206472 A1* | 8/2012 | Kandekar | G06Q 30/0214 345/581 |
| 2012/0210203 A1* | 8/2012 | Kandekar | G06F 17/30719 715/230 |
| 2012/0233544 A1* | 9/2012 | Roy | G06Q 10/10 715/274 |
| 2013/0007609 A1* | 1/2013 | Bak | G06F 17/30699 715/271 |
| 2013/0086031 A1* | 4/2013 | Marantz | G06F 17/30867 707/706 |
| 2013/0117702 A1* | 5/2013 | Jang | G06F 15/0291 715/776 |
| 2013/0185198 A1* | 7/2013 | Lorch | G06Q 20/29 705/39 |
| 2013/0191740 A1* | 7/2013 | Bell | H04L 67/22 715/273 |
| 2013/0204831 A1* | 8/2013 | Reshef | G06N 5/04 706/48 |
| 2013/0229270 A1* | 9/2013 | Srinivasan | H04W 36/18 340/328 |
| 2013/0246323 A1* | 9/2013 | Athas | G06N 5/02 706/46 |
| 2014/0005814 A1* | 1/2014 | Hwang | G11B 27/005 700/94 |
| 2014/0101085 A1* | 4/2014 | Lu | G06N 5/02 706/46 |
| 2014/0189484 A1* | 7/2014 | Fountenberry | G06F 17/2229 715/229 |
| 2014/0279852 A1* | 9/2014 | Chen | G06F 17/30023 707/609 |
| 2014/0324832 A1* | 10/2014 | Ionkov | G06F 17/30595 707/722 |
| 2014/0331142 A1* | 11/2014 | Li | G06F 17/30867 715/738 |
| 2014/0358773 A1* | 12/2014 | Lerner | G06Q 40/00 705/39 |
| 2014/0379746 A1* | 12/2014 | Chi | G06F 17/3071 707/767 |
| 2015/0112918 A1* | 4/2015 | Zheng | G06Q 30/02 706/48 |
| 2015/0120453 A1* | 4/2015 | Lee | G06Q 30/0261 705/14.58 |
| 2015/0154287 A1* | 6/2015 | Gao | G06F 17/30864 707/723 |
| 2015/0160806 A1* | 6/2015 | Fey | G06F 3/0484 715/748 |
| 2018/0067934 A1* | 3/2018 | Chen | G06F 17/30023 |

* cited by examiner

AUTOMATIC MAGAZINE GENERATOR FOR WEB CONTENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, rendering content on the client computing device, and interacting with the rendered content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

In some web browsing situations, a user has a specific amount of time for browsing and consuming content. For example, the user may have a half hour during the morning or an hour before bed to browse the web (e.g., read news articles or watch videos). However, finding content that is of interest to the user during this browsing period can be difficult. For example, the user may have to visit a number of web pages or web sites to find information that the user is interested in reading or watching. Furthermore, the user may have to pick and choose information from a variety of sources (while ignoring content that is not of interest) in order to find the content that the user wants to view. This process of identifying relevant content from various sources for a particular browsing session can be time consuming and inefficient.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

Figure 1:
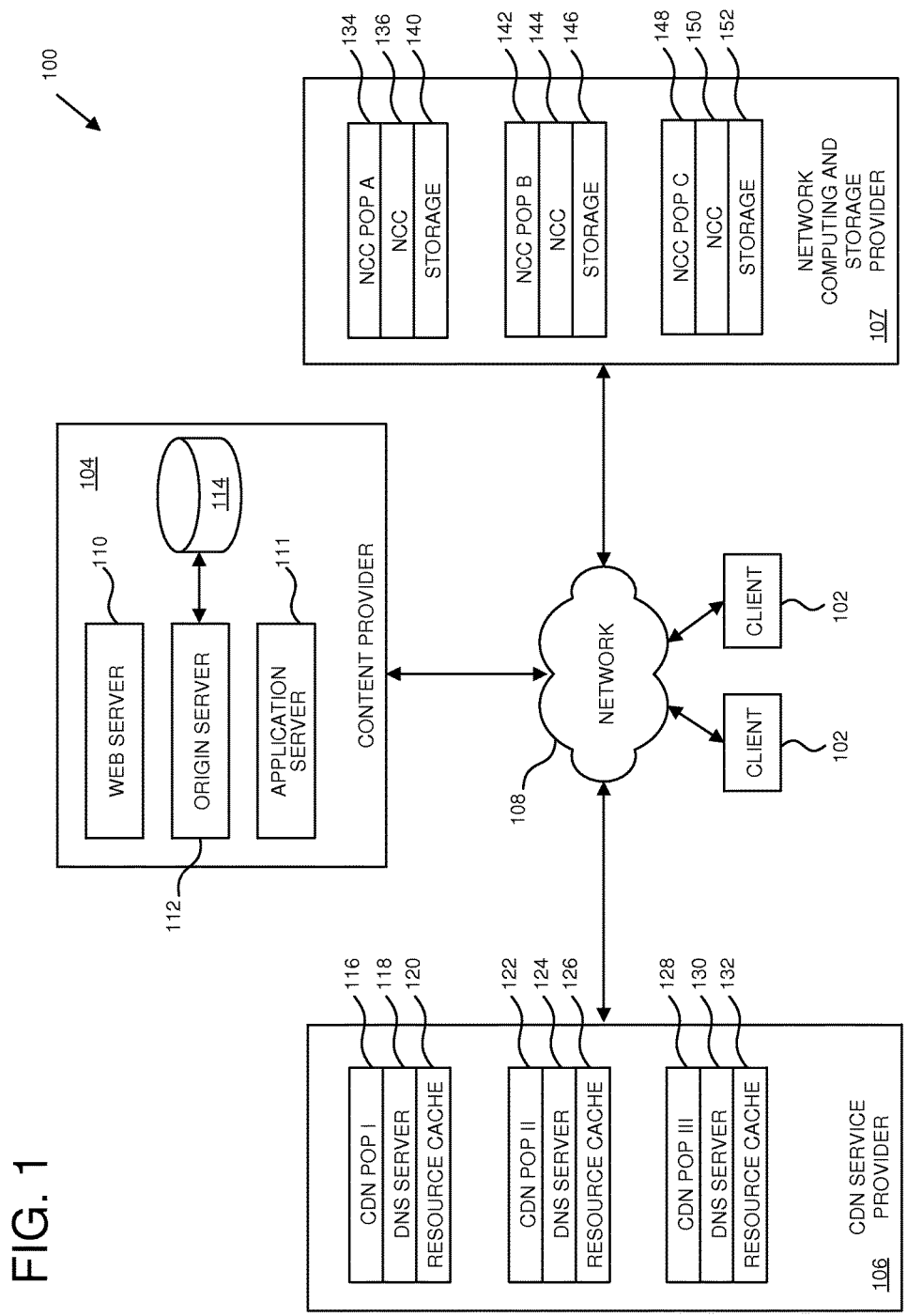
FIG. 1 is a block diagram illustrative of a content delivery environment including a number of client computing devices, content provider, a content delivery network service provider, and a network computing and storage provider.

The following description is directed to technologies for generating web content magazines. For example, a web content magazine can be generated by obtaining a user-specific interest model for a particular user (e.g., that includes information indicating the user's content browsing history and which may also include information indicating the user's reading speed), determining a reading time period (e.g., automatically or from the user), obtaining web content that can be read by the user within the reading time period, processing the obtained web content to generate the web content magazine, and providing the web content magazine for display. The web content magazine can contain an amount of content that can be read by the user within the reading time period according to the user's reading speed. The web content magazine can be generated by a server environment, by a client computing device, or using a combined approach with some operations performed by the server environment and other operations performed by the client computing device.

In order to support web content magazines, user-specific interest models can be created and maintained from browsing history (e.g., from the user's browse sessions) and/or from other content consumption activity engaged in by the user (e.g., email, instant messaging, social networking, web searching, etc.). The user-specific interest model can indicate the type of content the user is interested in (e.g., various topics of interest). The user-specific interest model can also indicate patterns of usage, which can include times, locations, etc., of access for various types of content (e.g., specific web pages, specific topics, etc.).

The technologies described herein for generating web content magazines can provide advantages in various browsing situations. For example, instead of having to search for content to read, a user can be presented (e.g., automatically or at the user's request) with a web content magazine that is personalized based on the user's content consumption history (e.g., as represented by the user's user-specific interest model). The web content magazine can also be presented with an amount of content that the user can read within a user-selected or automatically-determined time period. For example, if the user typically reads a variety of news and entertainment articles from a specific group of web sites each morning at 9:00 AM, a web content magazine can be created that extracts news and entertainment articles (e.g., from the specific group of web sites and/or from web sites with similar types of content) and prepares it for reading by 9:00 AM (e.g., prepares it in advance so it can be displayed at 9:00 AM without the user having to wait for the web content magazine to be created or downloaded).

Generally described, some aspects of the present disclosure are directed to the generation and management of a remote application session between client computing devices and content providers in conjunction with a network computing and storage provider. Specifically, some aspects of the disclosure will be described with regard to the request for a browse session by a client computing device with a content provider, the establishment of a remote browse session between the client computing device and a network computing and storage provider, and the transmission of browse session state data and client interaction data between the client computing device and the network computing and storage provider. Although some aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing and storage provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing and storage provider, including the selected URL. The address or location of a network computing and storage provider capable to service the browse session request may be hardcoded into the browser, may be configurable by the user, may be obtained from a network address service, or may be determined in any other way.

In an illustrative embodiment, responsive to the browse session request received from the client computing device, the network computing and storage provider may instantiate or cause to have instantiated one or more computing components associated with the network computing and storage provider that will host a browser software application. For example, the network computing and storage provider can instantiate, or cause to have instantiated, an instance of a virtual machine that includes a software browser application capable of requesting resources from a communication network. Illustratively, in some situations, one or more devices associated with the network computing and storage provider may be located in a data center or other robustly networked computing environment, and, as compared to the client computing device, may experience relatively little latency or delay when obtaining network resources.

Using the instantiated network computing components, the network computing and storage provider may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the requested content (e.g., the requested network resource and embedded resources), the network computing and storage provider may identify a remote session browsing configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configuration may specify that one or more processing actions to be performed on the requested content are to be performed at the network computing and storage provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. In accordance with the selected remote session browsing configuration, the client computing device and the instantiated network computing component may exchange processing results via browser session information (e.g., state data or display data representing the requested content).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing and storage provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing and storage provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing and storage provider 107 in communication with the one or more client computing devices 102, the CDN service provider 106, and the content provider 104 via the communication network 108. The network computing and storage provider 107 illustrated in FIG. 1 also corresponds to a logical association of one or more computing devices associated with a network computing and storage provider. Specifically, the network computing and storage provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing and storage provider 107 may maintain separate POPs for providing the NCC and the storage components. Additionally, although the NCC POPs 134, 142, 148 are illustrated in FIG. 1 as logically associated with a network computing and storage provider 107, the NCC POPs will be geographically distributed throughout the communication network 108 in a manner to best serve various demographics of client computing devices 102. Additionally, one skilled in the relevant art will appreciate that the network computing and storage provider 107 can be associated with various additional computing resources, such additional computing devices for administration of content and resources, and the like. Even further, one skilled in the relevant art will appreciate that the components of the network computing and storage provider 107 and components of the CDN service provider 106 can be managed by the same or different entities.

With reference to FIGS. 2-11, the generation and processing of network content in the context of a remote browse session instantiated at a network computing provider 107 will be described. Example embodiments of web content magazine creation in the context of the networked computing environment of FIG. 1 will be described further below with respect to FIG. 12. Additional example embodiments of web content magazine creation will be described further below with respect to FIGS. 13-19.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing and storage provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
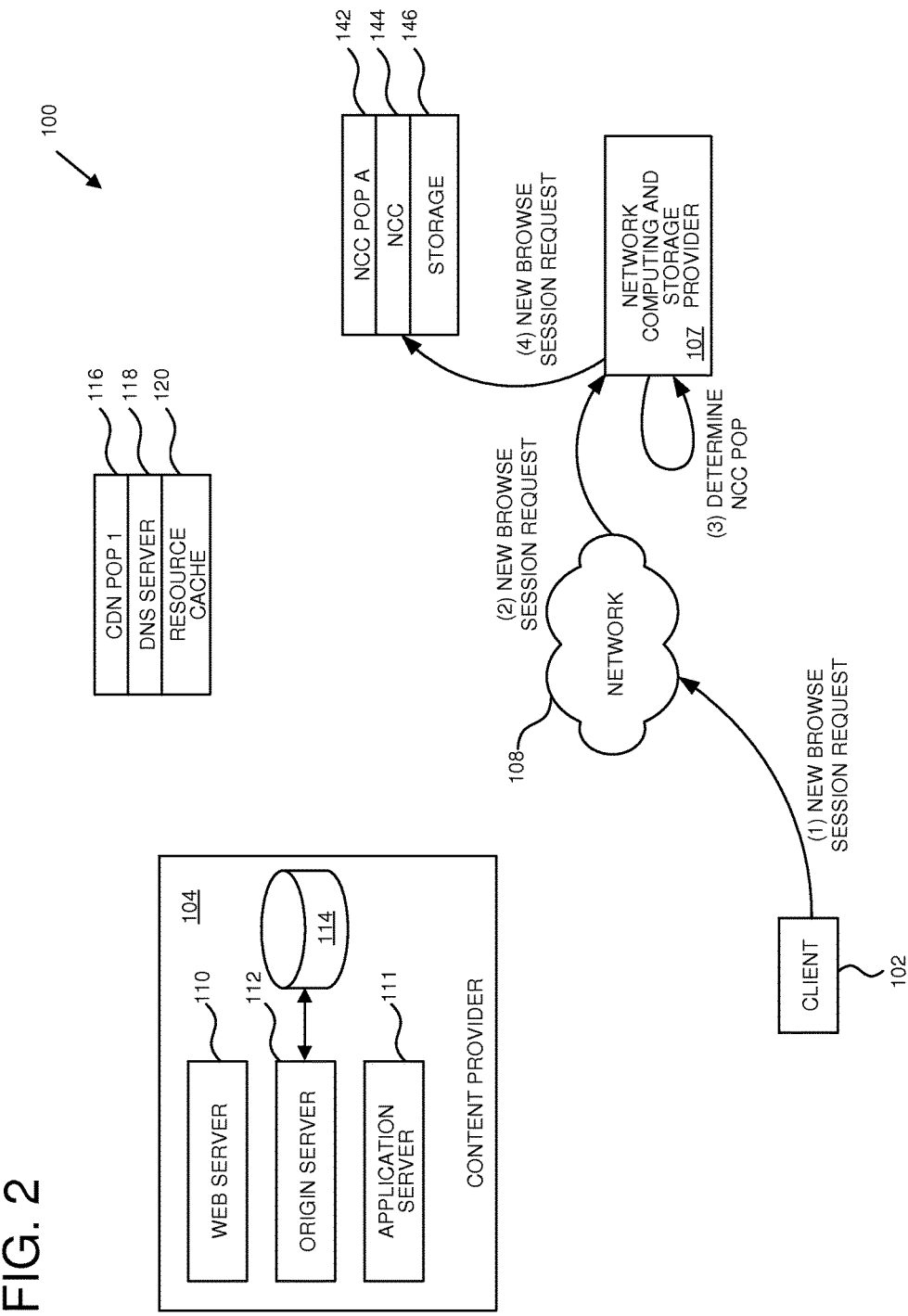
FIG. 2 is a block diagram of the content delivery environment of FIG. 1 illustrating the generation and processing of a new browse session request from a client computing device to a network computing and storage provider.

With reference to FIG. 2, the process can begin with the generation and processing of a browse session request from a client computing device 102 to a network computing and storage provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing and storage provider 107. In an illustrative embodiment, the network computing and storage provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing and storage provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
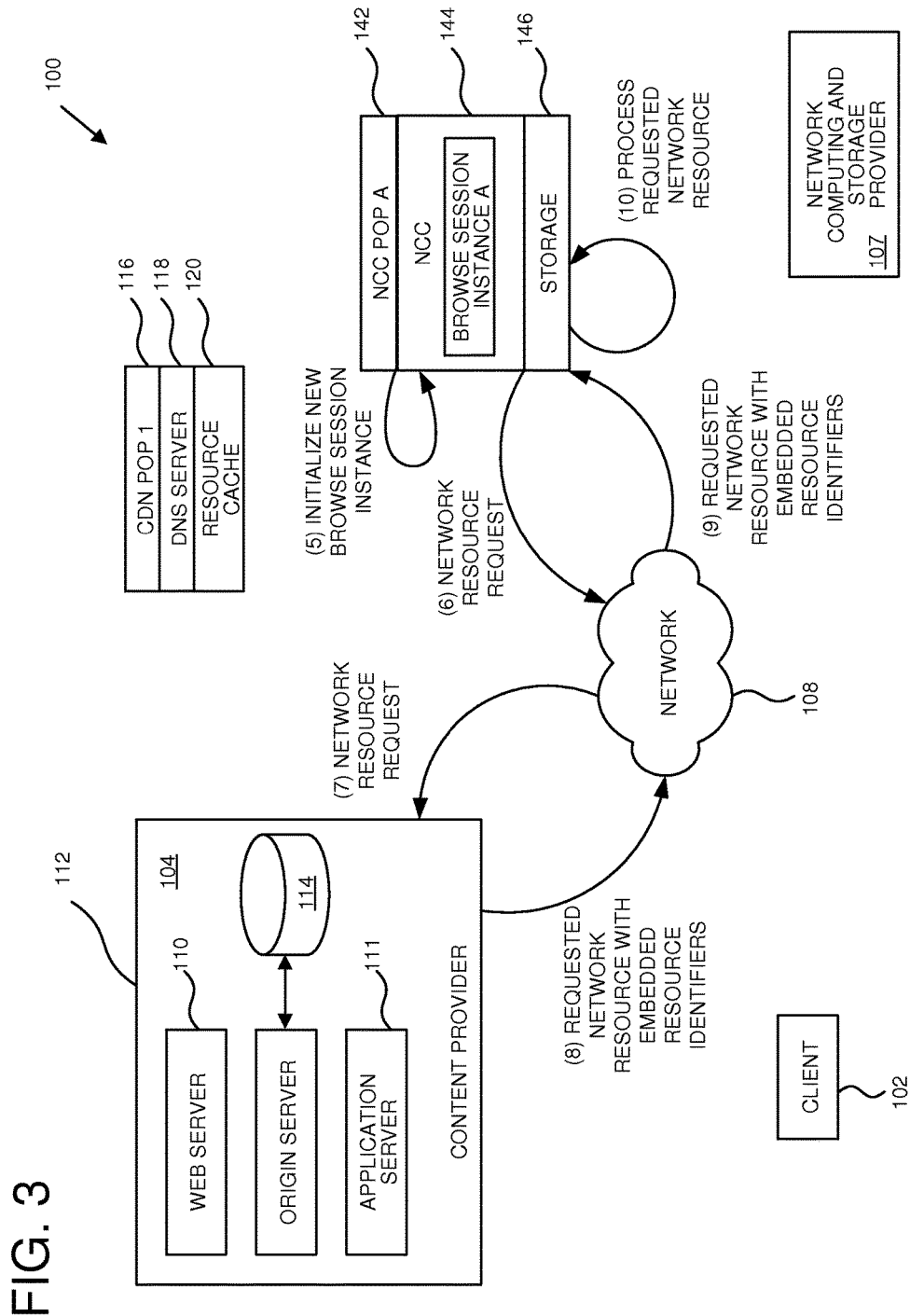
FIG. 3 is a block diagram of the content delivery environment of FIG. 1 illustrating the generation and processing of a request for a network resource from a network computing and storage provider to a content provider.

With reference to FIG. 3, an illustrative interaction for generation and processing of a request for a network resource from a network computing and storage provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing and storage provider (not shown), and may request the Web page from the content provider 104 at the resolved IP address. In various embodiments, a network resource may be retrieved from any combination of content providers, content delivery network (hereinafter "CDN") servers, or caches associated with the network computing and storage provider 107. For example, the network computing and storage provider may check if a resource is stored in a local cache or in another server or service provider associated with the network computing and storage provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
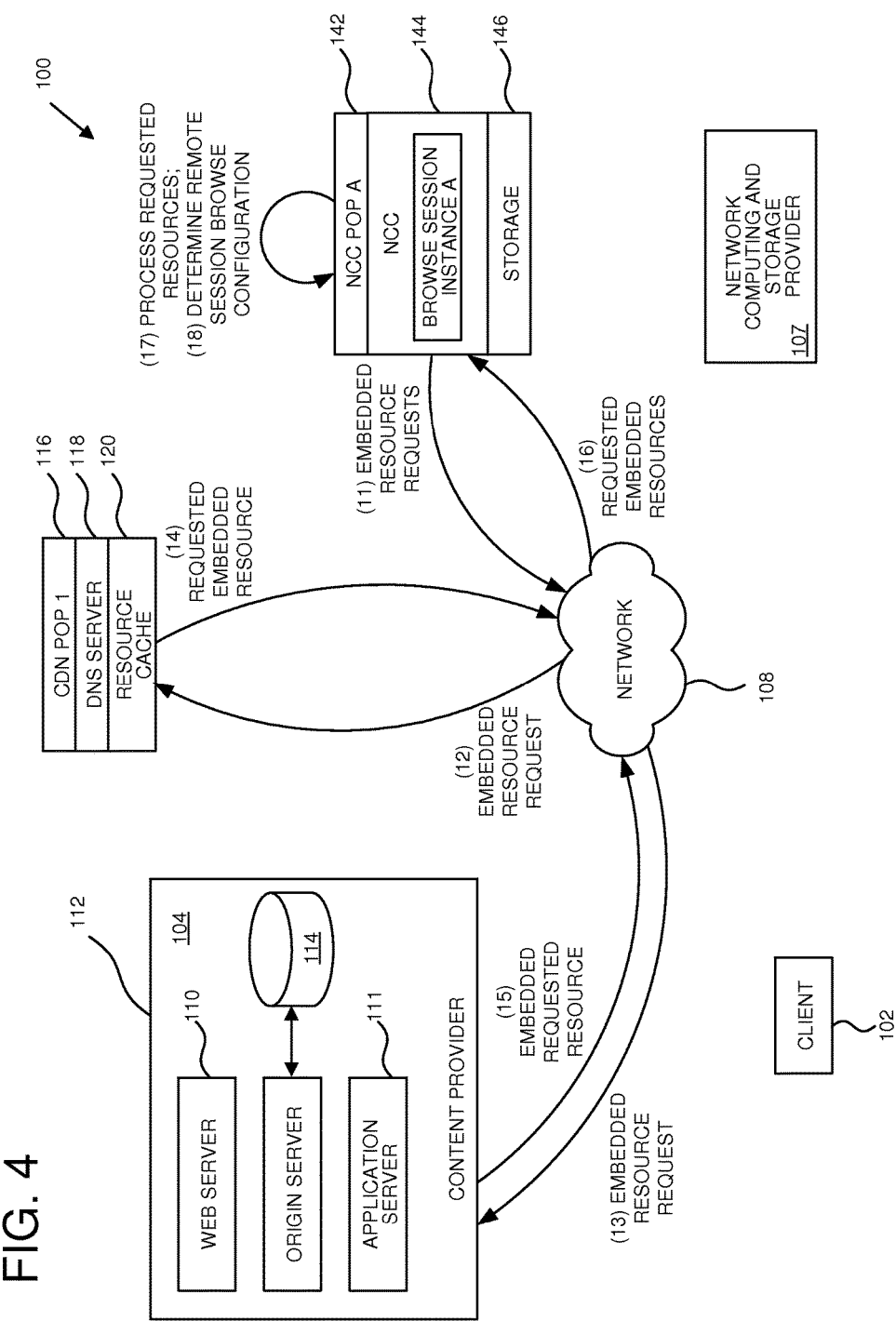
FIG. 4 is a block diagram of the content delivery environment of FIG. 1 illustrating the generation and processing of one or more requests corresponding to one or more embedded resources from a network computing and storage provider to a content provider and content delivery network.

With reference to FIG. 4, an illustrative interaction for generation and processing of one or more requests corresponding to one or more embedded resources from a network computing and storage provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing and storage provider 107. For example, the network computing and storage provider may check if an embedded resource is stored in a local cache or in another server or service provider associated with the network computing and storage provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
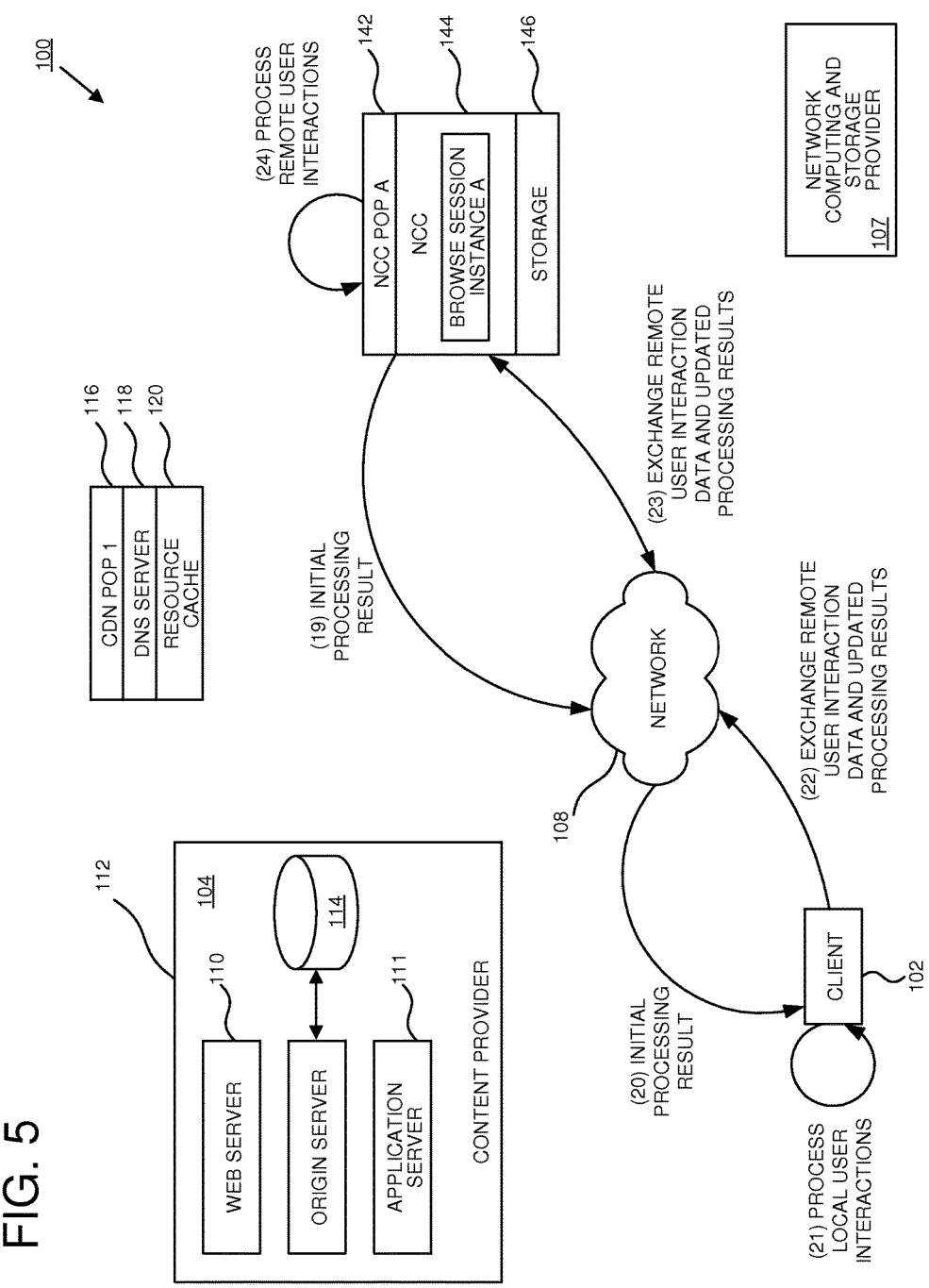
FIG. 5 is a block diagram of the content delivery environment of FIG. 1 illustrating the generation and processing of browse session data and user interaction data between a network computing and storage provider and client computing device.

With reference to FIG. 5, an illustrative interaction for generation and processing of processing results and user interaction data between a network computing and storage provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing and storage provider 107. The network computing and storage provider 107 may provide updated processing results to the client computing device in response to changes to the content or remote user interaction data from the client computing device.

Figure 6:
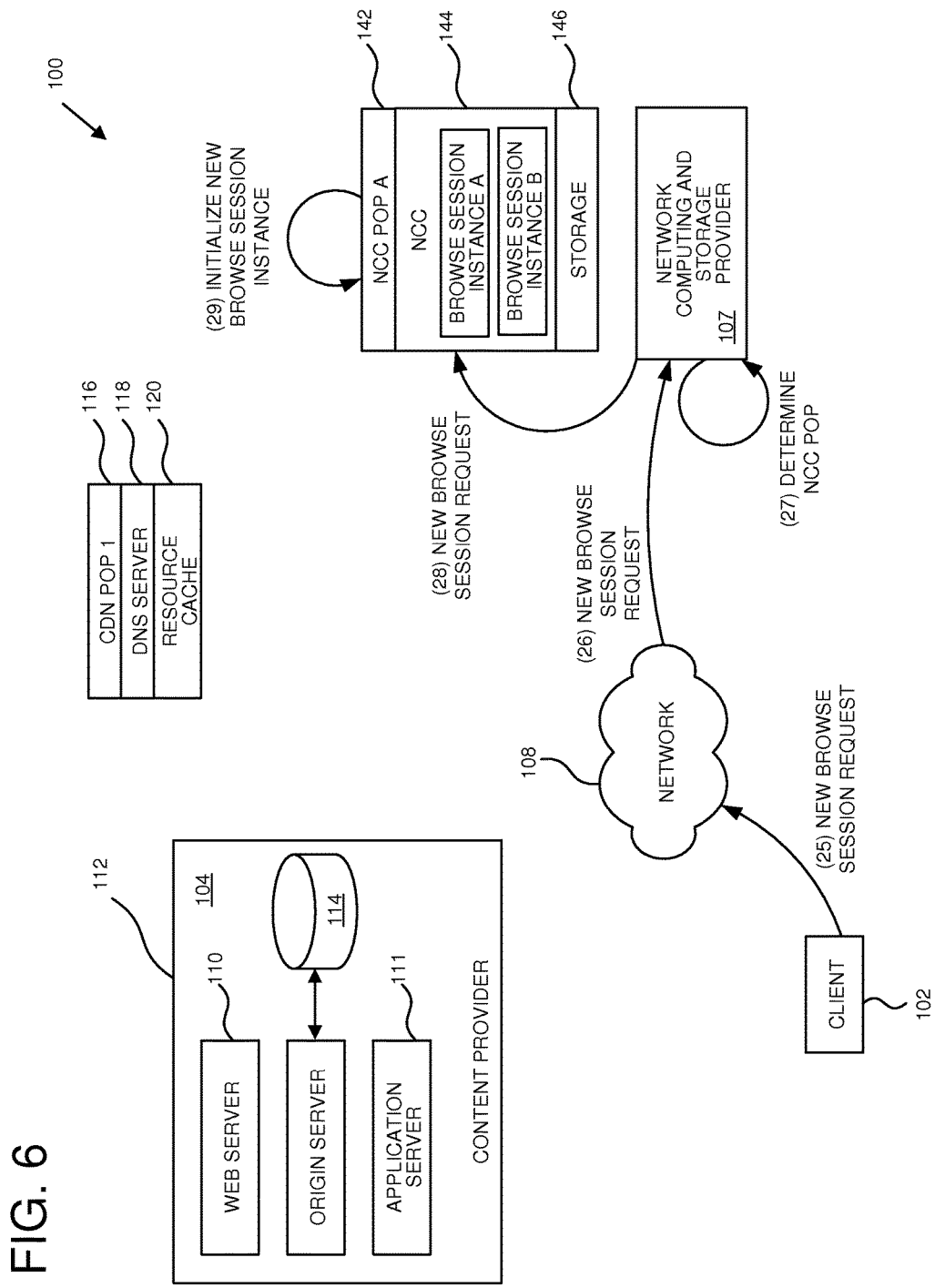
FIG. 6 is a block diagram of the content delivery environment of FIG. 1 illustrating the generation and processing of an additional new browse session request from a client computing device to a network computing and storage provider.

With reference to FIG. 6, a block diagram of the content delivery environment of FIG. 1 illustrating the generation and processing of an additional new browse session request from a client computing device to a network computing and storage provider is disclosed. As illustrated in FIG. 6, a second new browse session request may be sent to network computing and storage provider 107 from client computing device 102 across network 108. In an illustrative embodiment, the network computing and storage provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing and storage provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing and storage provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing and storage provider 107 may select an associated network computing component such as NCC POP 142 to service the browse session request. As discussed above with reference to FIG. 2, a network computing and storage provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing and storage provider 107 may select a number of NCC POPs to service a browse session request. Illustratively, although the network computing and storage provider 107 is depicted here for purposes of illustration as selecting NCC POP 142, the network computing and storage provider 107 may select any extant NCC POP to service the browse session request. For example, a single client computing device 102 may simultaneously or sequentially provide three different browse session requests to the network computing and storage provider 107 corresponding to different network resources. The network computing and storage provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
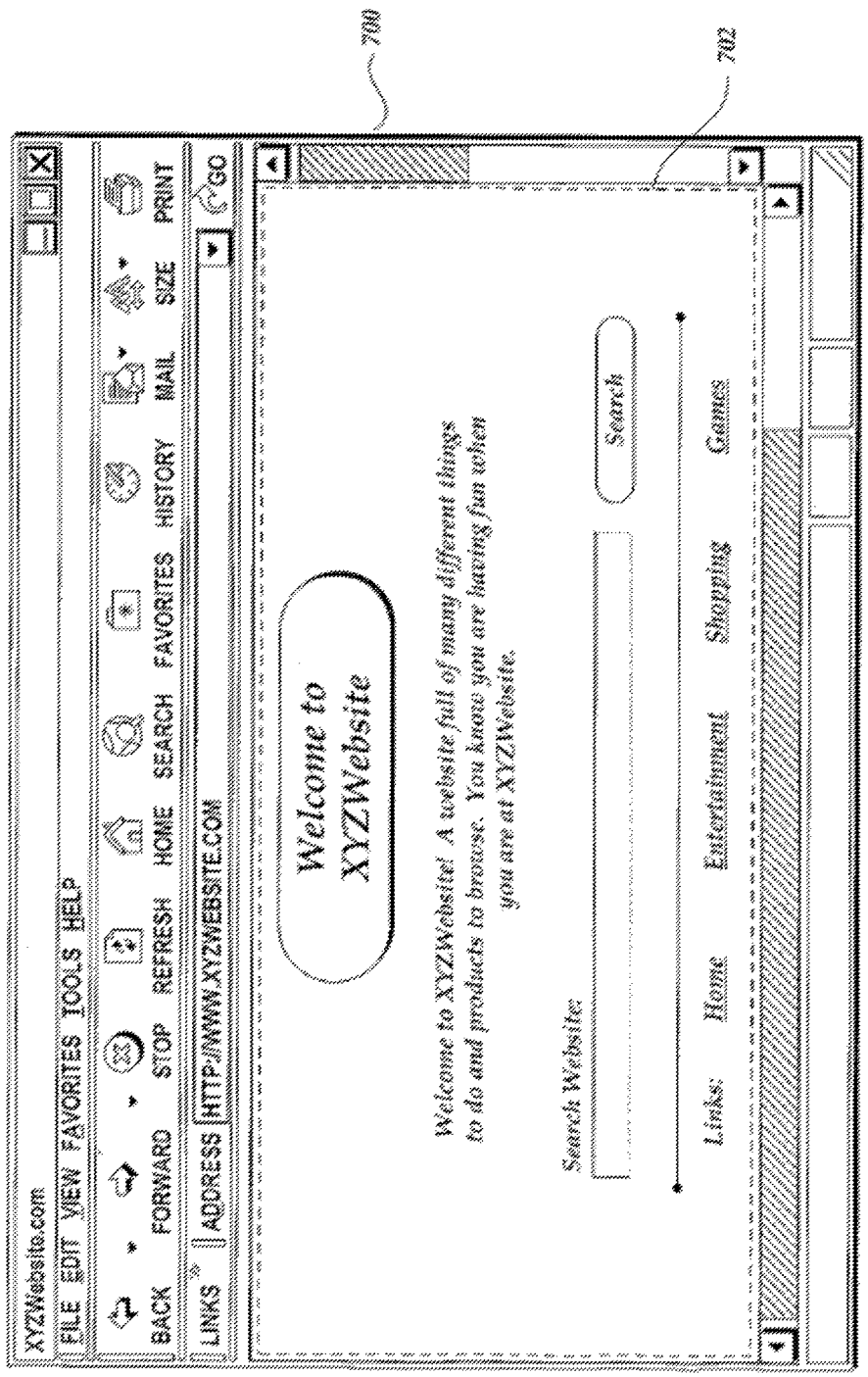
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
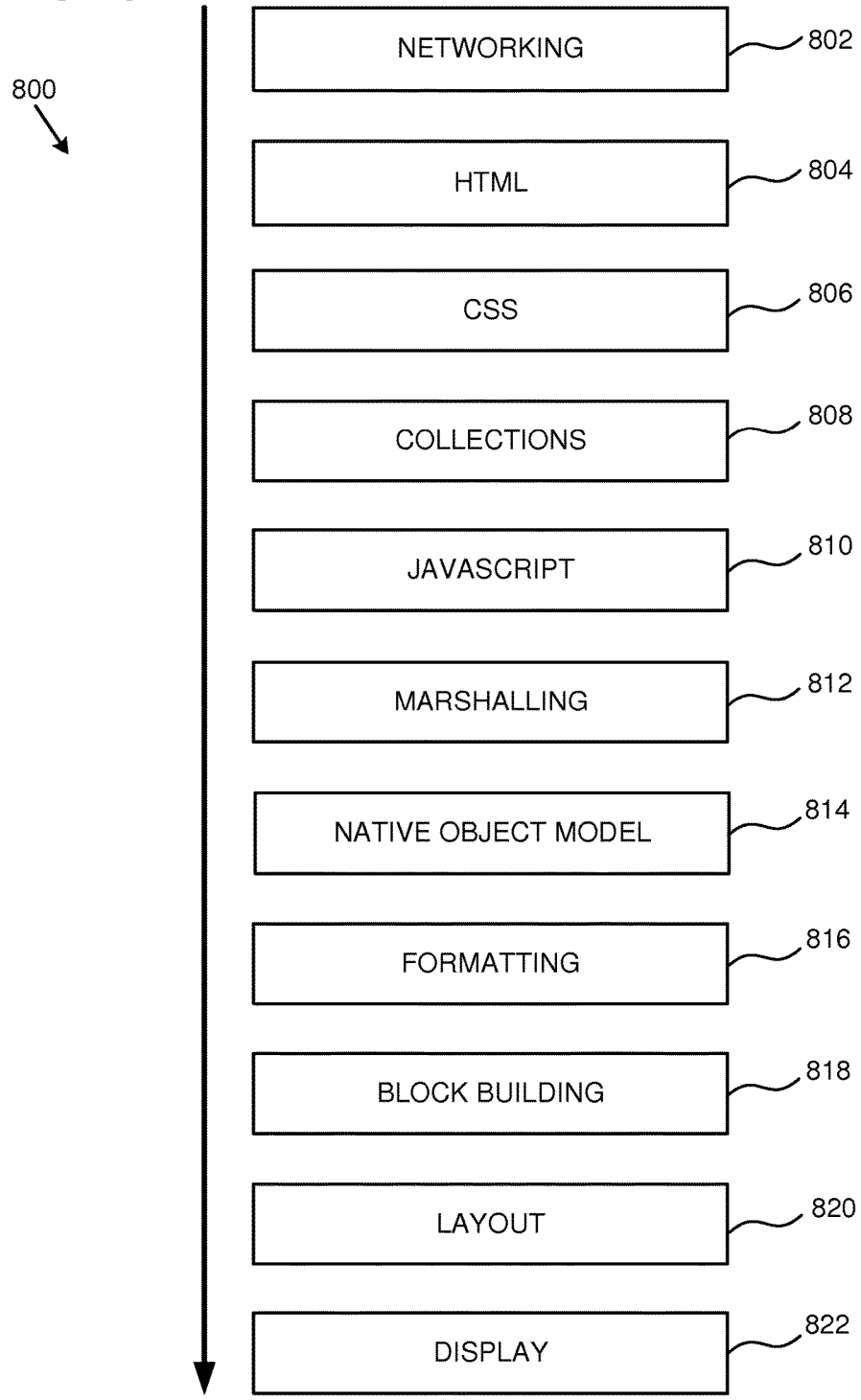
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions (processing operations). Illustratively, and as described above with reference to FIGS. 3-5, a remote session browsing configuration may specify a split between processing actions performed at a network computing and storage provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing and storage provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
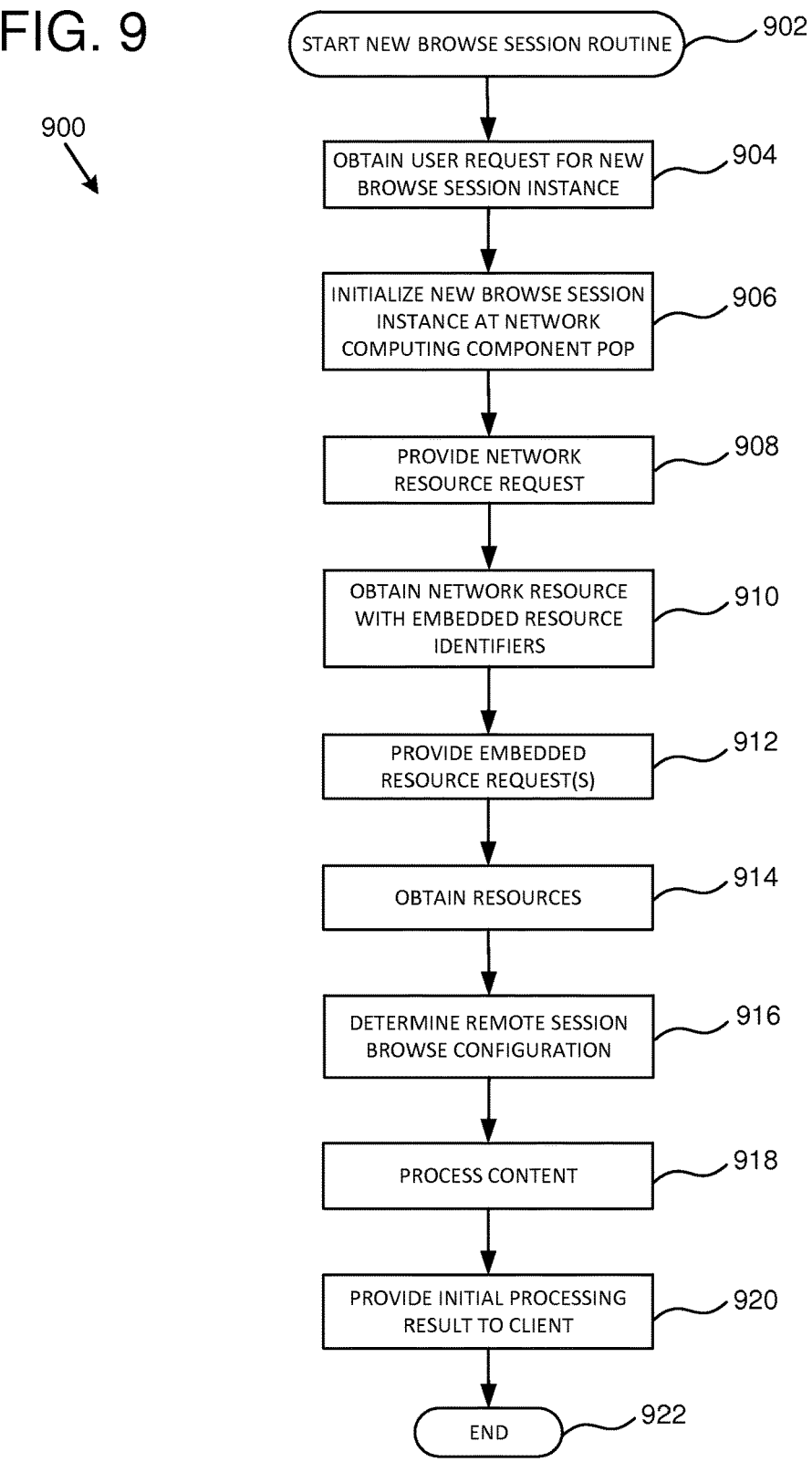
FIG. 9 is a flow diagram illustrative of a new browse session routine implemented by network computing and storage provider.

FIG. 9 is a flow diagram illustrative of a new browse session routine 900 implemented by network computing and storage provider 107 of FIG. 1. New browse session routine 900 begins at block 902. At block 904, the network computing and storage provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing and storage provider 107 may select an associated NCC POP to instantiate a new browse session based on the browse session request. As discussed above with reference to FIG. 1, a network computing and storage provider 107 may include any number of NCC POPs distributed across any number of physical or logical locations. A network computing and storage provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing and storage provider 107 may select a number of NCC POPs to service a browse session request. For example, the network computing and storage provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing and storage provider 107, NCC POP 142 may obtain the browse session request. In one embodiment, NCC POP 142 may have the browse session request forwarded to it by a component of network computing and storage provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing and storage provider 107, may be provided with a subset of information (e.g., just a network address of requested content), or may be provided additional information not included in the original browse session request.

Subsequent to the NCC POP 142 being selected, the network computing and storage provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing and storage provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing and storage provider or NCC POP 142 may instantiate any number of new virtual machine instances and/or browser instances (or make use of existing instantiated instances) based on a single browse session request.

At block 908 the network computing and storage provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing and storage provider 107. One of skill in the art will appreciate that, in the case of other embodiments, the link or network address may correspond to a document or file stored in a digital file locker or other network storage location or at a cache component associated with the network computing and storage provider 107 or client computing device 102. In some embodiments, the new session request may include a document or file in addition to or as an alternative to a network address. At block 910, the network computing and storage provider 107 obtains the one or more network resources. Subsequent to obtaining the requested network resource, the NCC POP 142 may process the network resource to extract embedded resource identifiers.

At block 912, the network computing and storage provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing and storage provider 107 may obtain these embedded resources from any number of different sources, sequentially or in parallel.

At block 916, the network computing and storage provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing and storage provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of a piece of network content be performed at the remote computing device, such as the NCC POP 142, rather than at the client computing device 102. Network content partially (or wholly) processed at the network computing and storage provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing and storage provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing and storage provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing and storage provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing and storage provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing and storage provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instances executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing and storage provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing and storage provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing and storage provider 107 may instantiate a browse session instance running on a first NCC POP and utilizing an RDP protocol as well as browse session instance running on a second NCC POP utilizing an X-Windows protocol. The client computing device 102 or the network computing and storage provider 107 may determine which browse session instance and protocol should be used based on performance or resource usage considerations as described with regards to determining a remote session browse protocol above.

With continued reference to FIG. 9, at block 918, the network computing and storage provider 107 may process the obtained content, including the one or more requested network resources and embedded network resources, according to the determined remote session browsing configuration to generate an initial processing result. At block 920, the network computing and storage provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
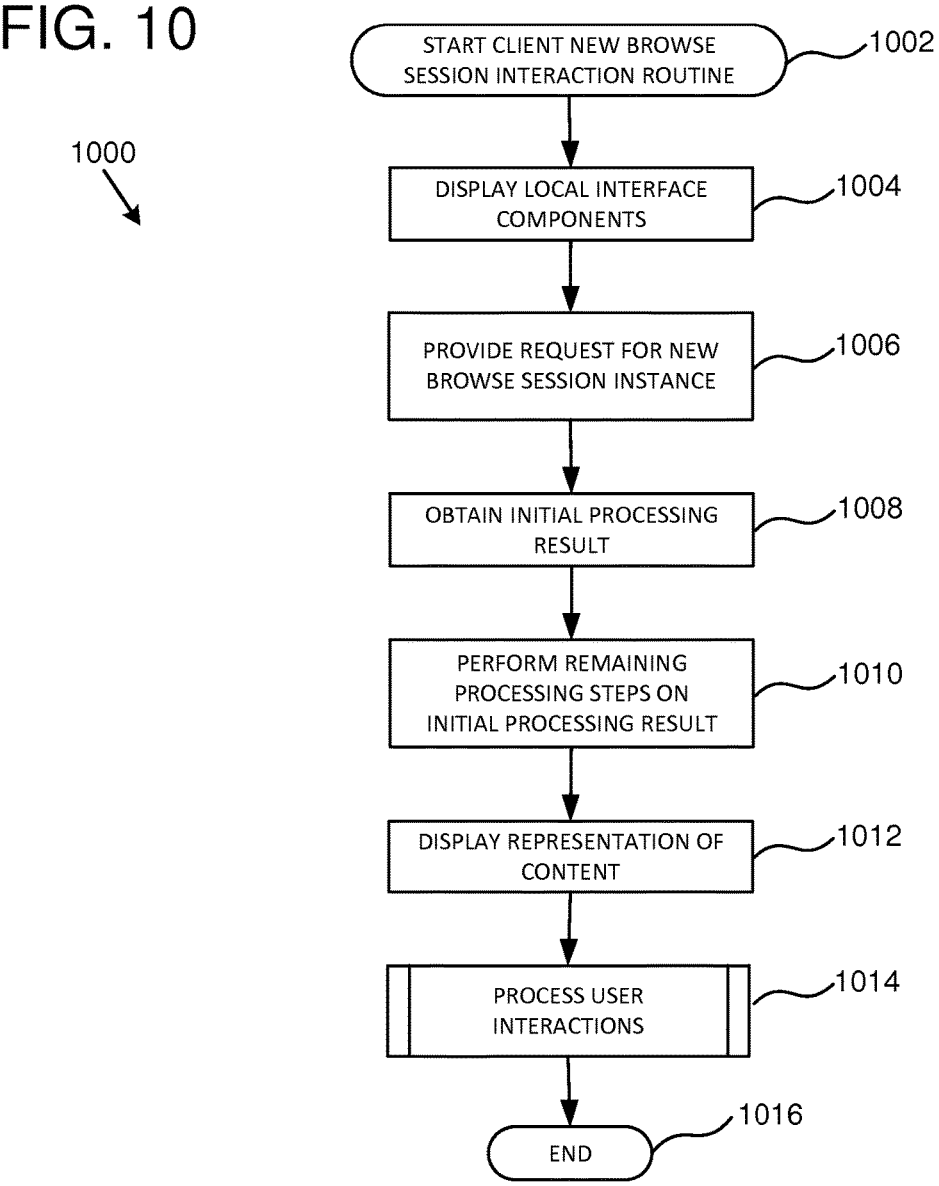
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing and storage provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing and storage provider 107. In an illustrative embodiment, the network computing and storage provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing and storage provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing and storage provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing and storage provider receiving a request for a new browse session instance at block 904 of FIG. 9 above.

At block 1008, the client computing device 102 obtains an initial processing result from the network computing and storage provider 107. Illustratively, the format and data included in the initial processing result may vary based on the remote session browsing configuration selected by the network computing and storage provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing and storage provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
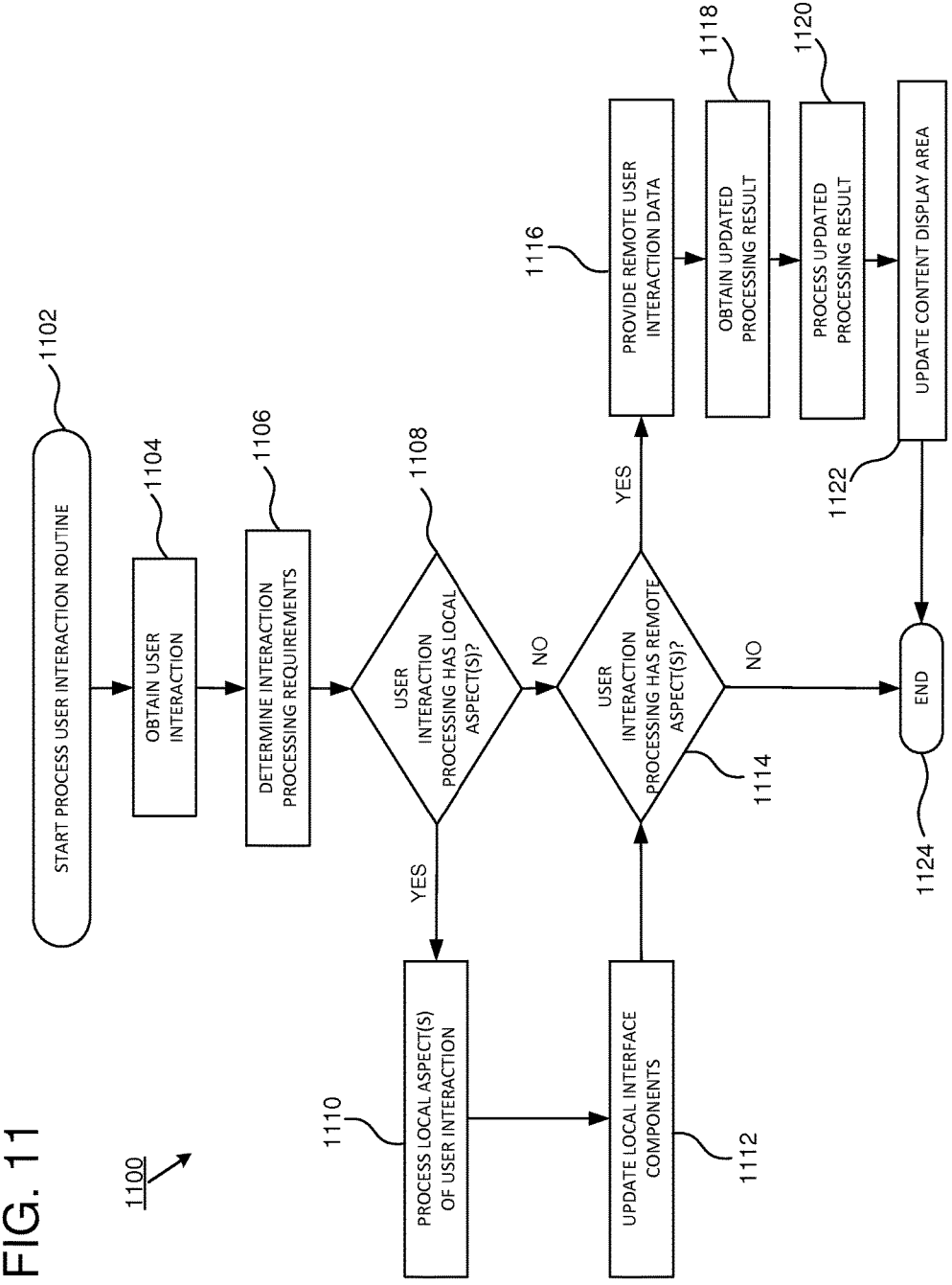
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing and storage provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing and storage provider 107 on a continuous basis, while in other embodiments of remote session browse configurations remote user interaction data may only be provided to the network computing and storage provider 107 when associated with a user interaction that requires remote processing.

At block 1118, the client computing device 102 obtains an updated processing result from the network computing and storage provider 107, the network computing and storage provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

In some embodiments, technologies are provided for generating web content magazines. For example, a web content magazine can be generated by obtaining a user-specific interest model for a particular user, determining a reading time period, obtain web content that can be read by the user within the reading time period, processing the obtained web content to generate a web content magazine, and providing the web content magazine for display. The web content magazine can contain an amount of content that can be read by the user within the reading time period according to the user's reading speed.

In some embodiments, a web content magazine is a collection of content (e.g., including content from web pages) organized to be viewed in electronic form as a set of content pages. The set of content pages can be an ordered or sequential set of content pages (e.g., including navigation elements for moving between pages).

The user-specific interest model can contain information regarding frequency of web content access (e.g., on a per-website and/or per-web page basis). For example, web content (e.g., a web page or web site, or another type of web content such as audio content or video content) can be associated in the model with an indication of how frequently the user access the web content (e.g., a count of the number of accesses per day, week, month, and/or other information indicating frequency).

The user-specific interest model can contain information regarding dwell time (e.g., on a per-website and/or per-web page basis). For example, the time between accessing the content and navigating to different content can be determined to be the dwell time (e.g., indicating how long the user spent reading or otherwise consuming the content).

The user-specific interest model can contain information regarding inbound and outbound navigation information (e.g., on a per-website and/or per-web page basis). For example, the inbound and outbound navigation information can indicate which content (e.g., which web page or web site) the user was viewing before the user navigated to the current web page and/or which content (e.g., which web page or web site) the user navigates to after viewing the current web page (e.g., the most frequently visited next web page, a list of the most frequently visited next web pages in order of frequency, etc.).

The user-specific interest model can contain temporal information (e.g., on a per-website and/or per-web page basis). For example, the temporal information can include a time of day when the user most often accesses the content (e.g., that the user most often accesses a particular web page at 7:30 AM), the day of the week the user most often accesses the content (e.g., on Mondays, on week days, on the weekend, etc.), and/or other temporal information (e.g., multiple access times during the day in order of frequency, specific dates of access such as holidays, etc.).

The user-specific interest model can contain location information (e.g., on a per-website and/or per-web page basis) indicating where the user accesses particular content. For example, the location information can indicate that the user accesses a particular web page at home, at work, while traveling to work, etc.

The user-specific interest model can contain platform information (e.g., on a per-website and/or per-web page basis) regarding which platform the user uses to access particular content. For example, the platform information can indicate which computing device (e.g., the user's phone, tablet, laptop, desktop, etc.) the user is using to access particular content (e.g., a particular web page or web site). The platform information can include software information (e.g., which web browser the user is using to access the content).

Figure 12:
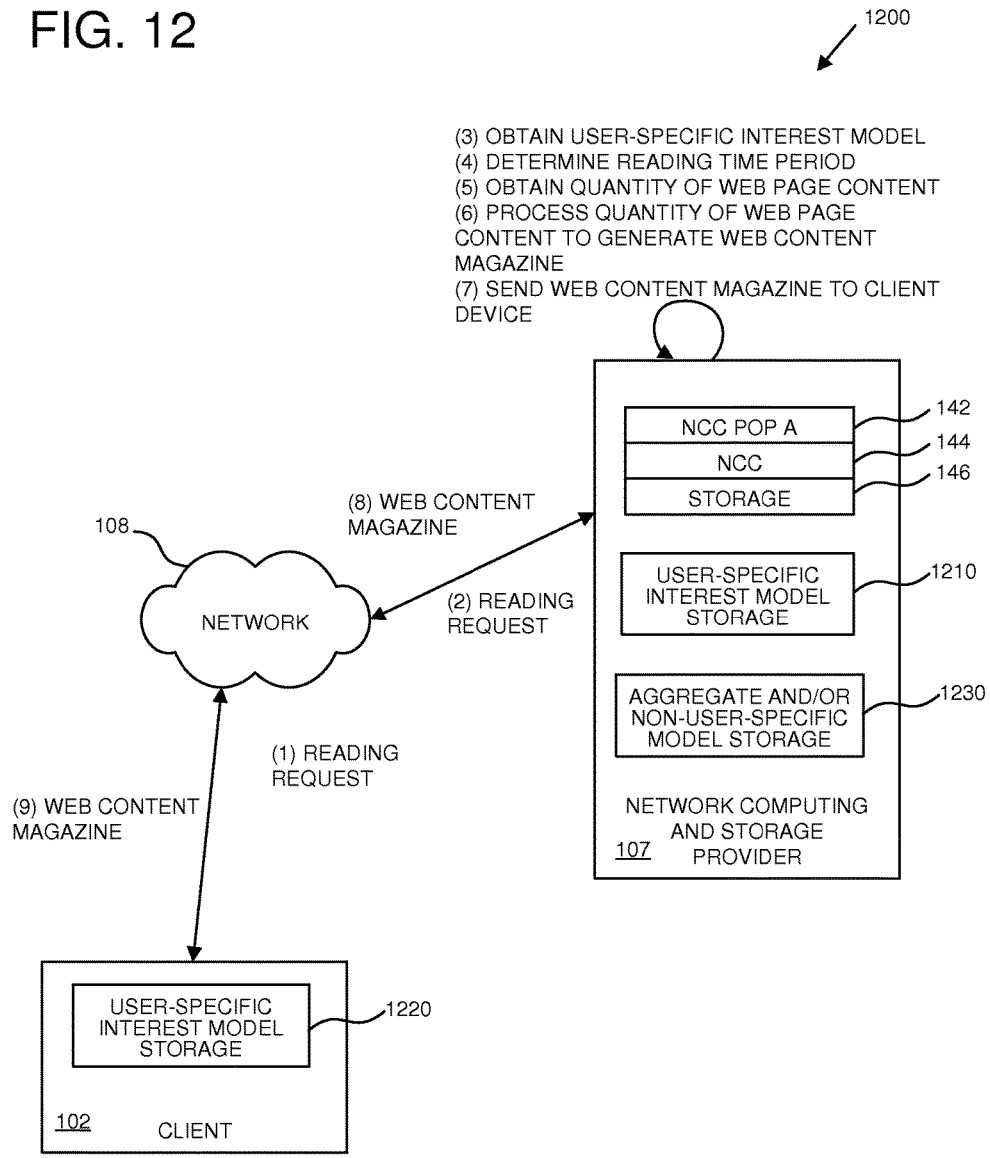
FIG. 12 is a block diagram of the content delivery environment of FIG. 1 in which web content magazines are generated.

With reference now to FIG. 12, the interaction between various components of the networked computing environment 100 of FIG. 1 will be discussed in the context of creating a web content magazine.

FIG. 12 is a block diagram 1200 of the content delivery environment of FIG. 1 in which web content magazines are generated. As depicted in the diagram 1200, a client computing device 102 can communicate with network computing and storage provider 107 via the network 108. Specifically, the client computing device 102 can perform content browsing activities (e.g., web browsing activities), in association with the network computing and storage provider 107. While only one client computing device 102 is depicted, the environment supports multiple client computing devices.

In some embodiments, the network computing and storage provider 107 generates web content magazines using user-specific interest models (e.g., stored in the user-specific interest model storage 1210). User-specific interest models can also be stored in NCC storage (e.g., in storage 146). For example, the network computing and storage provider 107 can obtain a user-specific interest model (e.g., from storage 1210 and/or storage 146) for a particular user, receive an indication of a reading time period, obtain web content that can be read by the user within the reading time period, and provide the web content to the client computing device 102 for presentation to the user as a web content magazine. In some embodiments, the network computing and storage provider 107 can process the web content to create a web content magazine (e.g., create the web content magazine in an HTML format that may include text, images, videos, etc., create the web content magazine as composited pages, and/or create the web content magazine in another format), and provide the web content magazine to the client computing device 102 for display to the user. The network computing and storage provider 107 can perform some processing for the obtained web content, and additional processing performed by the client computing device 102 (e.g., the network computing and storage provider 107 can provide processed web content to the client computing device 102 which can perform additional processing to prepare the web content for display as a web content magazine). In addition to, or instead of, a user-specific interest model (e.g., stored in 1210), the network computing and storage provider 107 can obtain aggregate models (e.g., reflecting aggregate content consumption activity from a number of users) and/or models that are not user-specific (e.g., models that reflect popular topics or articles, trending information, etc.) from the storage 1230. For example, the network computing and storage provider 107 can use a combination of a user-specific interest model (e.g., stored in 1210) and aggregate or non-user-specific models (e.g., stored in 1230) in order to determine which content to obtain for generating the web content magazine.

In some embodiments, the client computing device 102 generates web content magazines using user-specific interest models (e.g., stored in the user-specific interest model storage 1220). For example, the client computing device 102 can obtain a user-specific interest model (e.g., from storage 1220) for a user associated with the client computing device 102, receive an indication of a reading time period, obtain web content that can be read by the user within the reading time period (e.g., from the network computing and storage provider 102 and/or from other locations such as web servers and content servers), process the web content to generate a web content magazine, and display the web content magazine.

In some embodiments, both the client computing device 102 and the network computing and storage provider 107 can store user-specific interest models. For example, the client computing device 102 can store user-specific interest models specific to the user (or users) of the client computing device 102 in the storage 1220. The network computing and storage provider 107 can store user-specific interest models in the storage 1210 for a number of users that may utilize the network computing and storage provider 107.

In some embodiments, content restrictions can control or influence which content can be obtained by the server and/or client device. For example, the location of the client device (e.g., client computing device 102) may result in content restrictions (e.g., due to mobile carrier content restriction rules). Content restriction rules can be applied (e.g., resulting in unavailable content or different versions of content) when the client device or server performs operations to obtain the content (e.g., HTTP requests and subsequent content downloads). For example, content restrictions can be imposed when the server (e.g., network computing and storage provider 107) performs HTTP requests, when the server determines which content to obtain (e.g., based on criteria such as bandwidth, performance, local rules for the client device location, etc.), and/or when the client device performs HTTP requests or determines which content to obtain.

Figure 13:
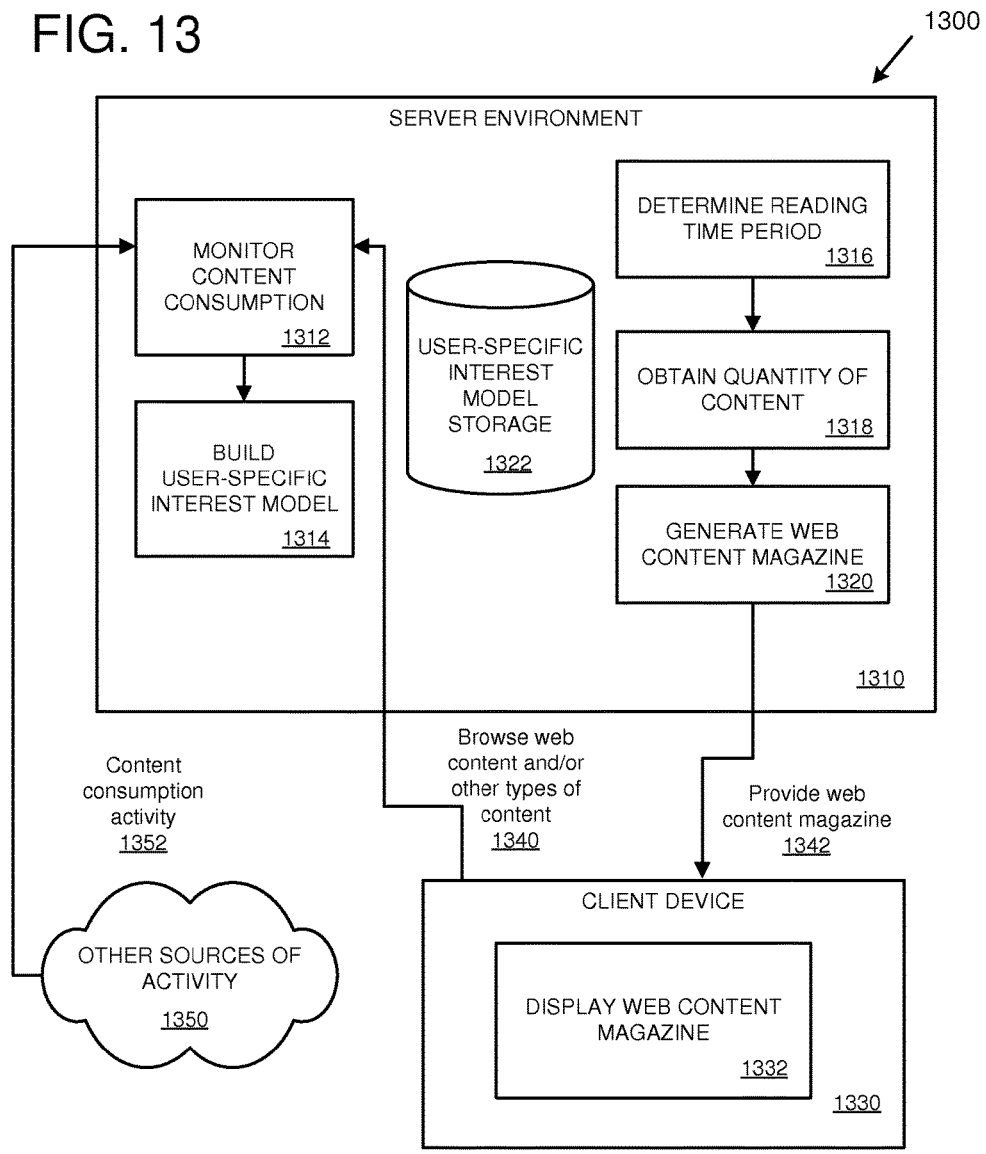
FIG. 13 is a block diagram depicting an example environment for generating web content magazines.

FIG. 13 is a block diagram 1300 of an example environment within which web content magazines are generated. In some embodiments, a web content magazine is generated as a set of content pages (e.g., an ordered set of content pages). The example environment includes a server environment 1310 (e.g., a cloud-based or network-based web browsing environment operated by one or more computer servers, such as a network computing and storage provider). The server environment 1310 can provide content browsing services to client devices, including client device 1330. For example, the server environment 1310 can participate in browsing of web pages, social media content, audio content, video content, and/or other types of content. As an example, client device 1330 can browse web content and/or other types of content, as indicated at 1340. The server environment 1310 can monitor the content consumption, as indicated at 1312, and build a user-specific interest model, as indicated at 1314. The user-specific interest model reflects content browsing activity performed by the user of the client device 1330. The server environment 1310 can store the user-specific interest model in the user-specific interest model storage 1322. The server environment 1310 can also monitor other sources of activity 1350 (e.g., other sources of content consumption activity), as indicated at 1352. The server environment 1310 can take into account the content consumption activity in building the user-specific interest model, as indicated at 1314.

Consumption monitoring and creation of user-specific interest models (e.g., as depicted at 1312 and 1314) can be controlled by permissions. For example, in some implementations a user can authorize monitoring of content browsing activity and/or creation of user-specific interest models based on such monitoring.

The server environment 1310 can automatically generating a web content magazine for providing to the client device 1330. For example, the server environment 1310 can automatically generate the web content magazine upon user request and/or proactively (e.g., to pre-cache the web content magazine and/or send the web content magazine to the client device 1330 before being requested by the user).

In some embodiments, the server environment 1310 generates the web content magazine by first determining a reading time period, as indicated at 1316. For example, the server environment 1310 can receive an indication of the reading time period from the client device 1330 (e.g., from the user of the client device 1330 selecting a user-interface option specifying the reading time period). The server environment 1310 can also determine the reading time period automatically (e.g., without being specified by the user) based on the user-specific interest model. For example, the user-specific interest model can include information regarding a pattern of usage where the user reads news articles for 30 minutes in the morning at 8:00 AM. The server environment 1310 can then determine that the reading time period is 30 minutes.

The server environment 1310 next obtains a quantity of content that can be read within the reading time period, as indicated at 1318. For example, the server environment 1310 can use the user-specific interest model for the user to determine which content to obtain (e.g., based on access patterns, timing information, topics of interest, etc.). Other criteria can also be used to determine the subject matter and/or quantity of content to obtain. For example, platform characteristics and capabilities (e.g., screen size or bandwidth) can influence selection of different versions of content (e.g., rich-media versions or low-bandwidth versions) and location information can influence content subject (e.g., content can be localized based on a current location such as local restaurant content being obtained in relation to a restaurant topic). The server environment 1310 can determine the quantity to obtain based on the reading time period and the user's reading speed. For example, if the reading time period is 30 minutes and the user's reading speed is 300 words-per-minute, the server environment 1310 can select an amount of content (e.g., select content from web pages, web sites, and/or from other sources) that can be read by the user within 30 minutes according to the user's reading speed. The quantity of content that can be read by the user within the reading time period can include various types of content including text, images, audio, video, etc. For example, the amount of time needed to read text content can be determined by the user's reading speed while the amount time needed to consume other types of content can be determined in other ways (e.g., the amount of time needed to consume audio and video content can be determined by the playback time of the audio and video content). In situations involving mixed content (e.g., content other than just text and images), the amount of time needed to "read" the content (e.g., which may include reading text, listening to audio, and/or watching video) can include the time needed to read the text plus the time needed to listen to the audio plus the time needed to watch the video. For example, if the reading time period is 30 minutes, the quantity of content can include 25 minutes worth of text plus 5 minutes worth of video.

The server environment 1310 next generates a web content magazine from the obtained content, as indicated at 1320. For example, the server environment 1310 can generate the web content magazine in an HTML format that presents the content in a simplified format (e.g., in a format with minimal header and navigation information that presents a number of articles and/or other types of content in a sequential order for reading). The server environment 1310 provides the web content magazine to the client device 1330, as indicated at 1342. The client device 1330 then displays the web content magazine to the user, as indicated at 1332. In some implementations, the web content magazine may be generated (as indicated at 1320) in a format that is ready, or almost ready, for display by the client device 1330 (e.g., as composited pages) and/or in a format that needs additional processing by the client device 1330 (e.g., as HTML and associated resources that need to be processed, composited, and/or rendered by the client device 1330 to prepare for display). Splitting of processing operations can be dependent, for example, on criteria such as bandwidth, performance, and magazine content (e.g., a large magazine in terms of storage size may be processed by the server environment to reduce memory usage and bandwidth to the client device).

In some embodiments, a user-specific interest model is created (e.g., as depicted at 1312 and 1314) based on content browsing activity performed by a particular user. For example, the user may access content such as web page content (e.g., text content, images, videos, search engines, etc.), social networking content (e.g., instant messages, social networking web sites, etc.), email content, and/or other types of content. Information related to the content browsing activity can also be utilized when creating the user-specific interest model, such as time of access, frequency of access, location of access, dwell time, topic of the content, pervious/next navigation information (e.g., the content the user viewing before accessing the current content, the next content the user selects, etc.), the platform (e.g., hardware and/or software) the user is using to access the content, etc.

The user-specific interest model can store a variety of information related to the browsing activity. For example, the user-specific interest model can store information on a per-content basis (e.g., for each web page, web site, and/or other specific content item), including frequency of access, dwell time, inbound and outbound activity, location of the user during the access, platform information, topic information (e.g., the topic or topics of the content), entity information (e.g., which entity or entities are related to the content), etc. The user-specific interest model can also store information on an aggregate basis (e.g., aggregate information for a group or collection of web pages, web sites, or other types of content). For example, the user-specific interest model can store information that is grouped based on topics (e.g., by grouping browsing activity based on system-defined and/or user-defined topics, such as news, popular press, hobbies, technology, etc.).

The user-specific interest model can store information related to reading speed. For example, the amount of time a user spends viewing a specific content item (e.g., a web page or web site) can be used to calculate the user's reading speed. Reading speeds can be maintained for different types of content (e.g., on a per-topic basis). For example, the user's average reading speed can be calculated form the last 30 days of browsing history for each of a plurality of topics, such as news, popular press, hobbies, technology, etc. As a specific example, if the user spends 14 minutes reading a 5,000 word article (e.g., as determined from the dwell time), then the user's reading speed can be determined to be 357 words-per-minute (e.g., and included in an average reading speed calculation reflecting the user's reading speed stored in the user-specific interest model). The reading speed of the user can be adjusted based on various factors that indicate whether the user was focused or not (e.g., the reading speed can be adjusted higher if the user was not focused). For example, if the user is reading an article on a web page with a lot of surrounding elements that are not part of the article (e.g., other images, ads, links, videos, etc.), then the user's reading speed may be adjusted to compensate (e.g., inferring that the user was distracted).

The user-specific interest model can store information related to patterns of content access. For example, if the user accesses a particular web site, or sequence of web sites, at the same time each day, then such information can be stored in the user-specific interest model. For example, the user may access three news web sites each morning at 8:00 AM. The user's user-specific interest model can store information indicating the three web sites and the time of access.

Figure 14:
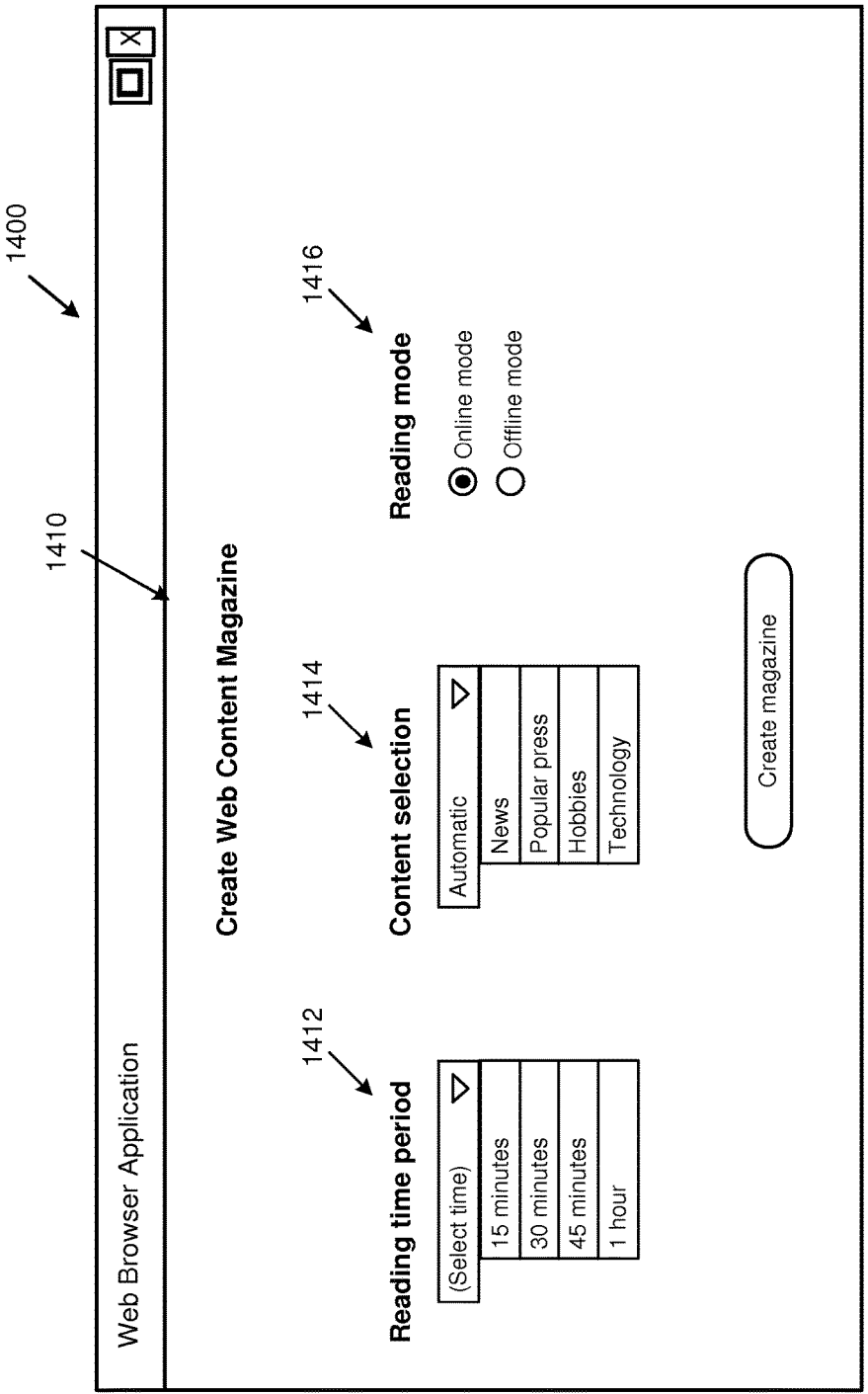
FIGS. 14 and 15 are diagrams depicting example web page user interfaces for creating web content magazines.

FIG. 14 is a diagram 1400 depicting an example web page user interface 1410 for creating a web content magazine. For example, the web page user interface 1410 can be displayed by a client device, such as client computing device 102 or client device 1330, in communication with a web server, such as network computing and storage provider 107 or server environment 1310. The example web page user interface 1410 can be displayed in response to receiving an indication that a user wants to create a web content magazine. For example, the user can select a particular web page (e.g., enter a particular URL, select a link on a web page, etc.) for creating a web content magazine.

As depicted in the example web page user interface 1410, the user is presented with a number of user interface options for creating a web content magazine. Specifically, the user is presented with a reading time period selection control 1412. The reading time period selection control 1412 allows the user to select how much time the user wants to read (e.g., 15 minutes, 30 minutes, and so on). The web content magazine can be generated with content that can be read by the user within the selected reading time period (e.g., taking into account the user's reading speed as well as the amount of time needed to listen to audio or watch video). The reading time period selection control 1412 can include specific reading time periods different from those depicted (e.g., more or fewer pre-defined reading time periods from which the user can select). Additional and/or different user-interface controls can be provided for entering the reading time period (e.g., a fill-in field for entering an arbitrary reading time period).

The user is also presented with a content selection control 1414. The content selection control 1414 allows the user to select a topic for the reading time period. The list of topics that are available for selection can include user-specific topics (e.g., topics dynamically selected based on the user's past content browsing history which may be stored within the user's user-specific interest model) and/or topics selected based on other criteria (e.g., topics that are popular among a user population, which may be stored in aggregate content browsing history models). In some situations, the user can select an "automatic" option where the topic (or topics) are selected automatically based on the user's user-specific interest model (e.g., based on topics that the user has accessed previously, based on timing information such as the current time of day or day of the week, based on location information, etc.). Additional and/or different user-interface controls can be provided for selecting the topic(s) (e.g., check boxes for selecting one or more topics, a fill-in field for entering one or more arbitrary topics, etc.).

The user is also presented with a reading mode selection control 1416. The reading mode selection control 1416 allows the user to select whether the web content magazine will be generated for online reading or offline reading. For example, online mode can be selected when the user will be connected to a network and/or when the user wants to minimize processing delays or spread out bandwidth usage over time (e.g., to begin reading the web content magazine once the first "page" of the magazine has been created and downloaded to the user's device without having to wait for the entire magazine to be created and downloaded). The offline mode can be selected when the user will not be connected to a network (e.g., when the user is preparing to board a flight and wants to read the web content magazine offline) and/or when the user otherwise wants read the web content magazine in an offline mode that does not require a network connection.

The user is also presented with a "create magazine" button that allows the user to initiate creation of the web content magazine according to the selected controls 1412, 1414, and 1416. For example, the web content magazine can be created on a server environment and downloaded to the user's device, or created locally by the user's computing device (e.g., the user's desktop, laptop, phone, tablet, or other computing device).

Web page user interfaces can be provided for creating web content magazines that include user interface controls other than those depicted in the example web page user interface 1410. For example, one or more options may be automatically determined instead of providing a control (e.g., the content selection control 1414 can be automatically determined without providing a control for user selection). As another example, selection of the content to be presented in the web content magazine can be determined from a search query entered by the user (e.g., according to content returned within search engine results).

Figure 15:
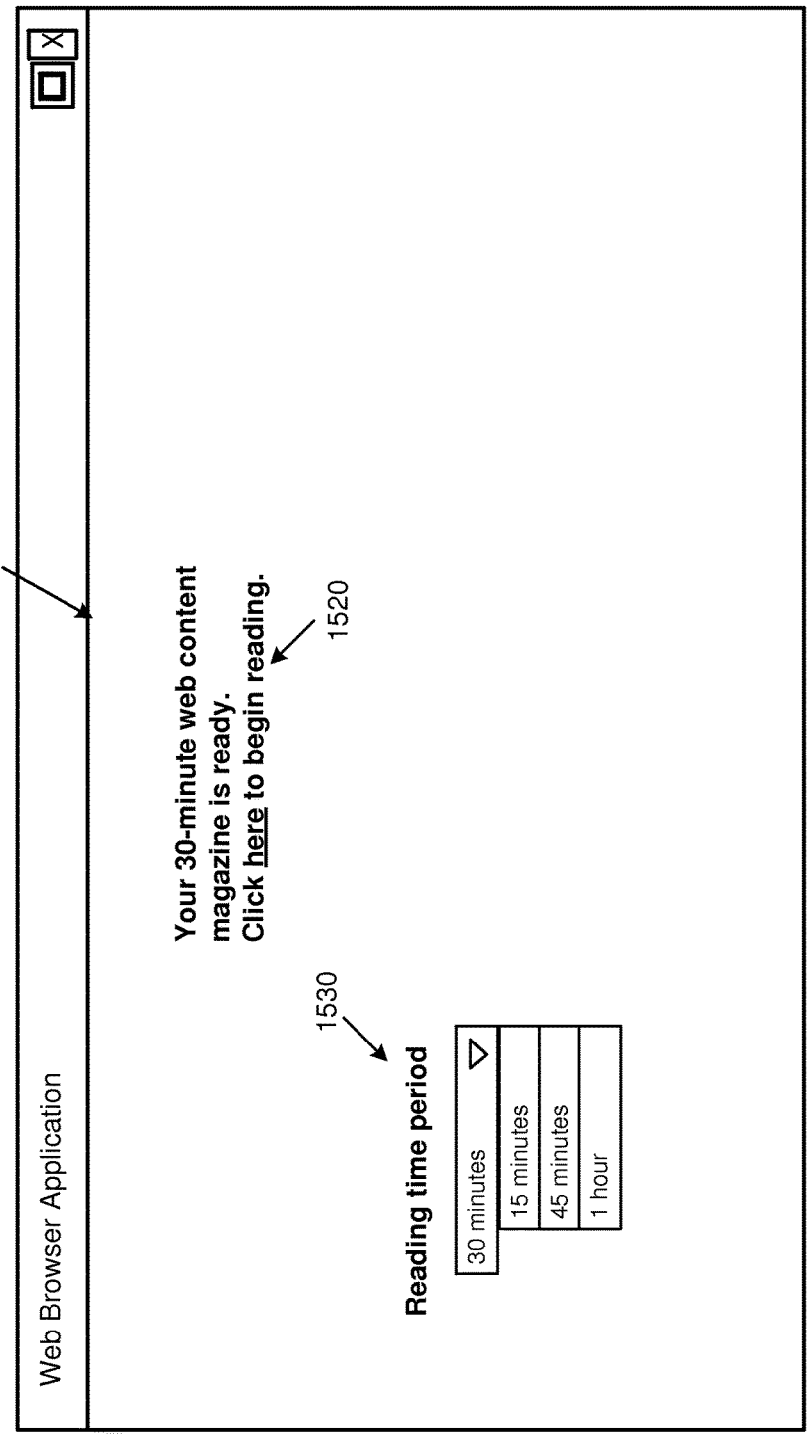

FIG. 15 is a diagram 1500 depicting an example web page user interface 1510 for creating a web content magazine. For example, the web page user interface 1510 can be displayed by a client device, such as client computing device 102 or client device 1330, in communication with a web server, such as network computing and storage provider 107 or server environment 1310. The example web page user interface 1510 can be displayed in response to receiving an indication that a user wants to read a web content magazine. For example, the user can select a particular web page (e.g., enter a particular URL, select a link on a web page, etc.) for reading a web content magazine. The example web page user interface 1510 can also be displayed automatically. For example, the example web page user interface 1510 can be displayed as a pop-up window (or another type of alert or notification) to indicate that a web content magazine is ready to read.

As depicted in the example web page user interface 1510, the user is presented with a message letting the user know that a web content magazine is ready to read. Specifically, the message depicted at 1520 alerts the user that a 30-minute web content magazine is ready, and the user is prompted to select a link to begin reading. Upon selecting the link, the web content magazine can be displayed to the user (e.g., the web content magazine may have been generated beforehand or it may be generated upon receiving the user selection of the link). Other user interface elements can be provided for making the selection, such as a button.

As depicted in the example web page user interface 1510, the user is also presented with a reading time period selection control 1530. The reading time period selection control 1530 allows the user to select how much time the user wants to read (e.g., 15 minutes, 30 minutes, and so on). As depicted, the reading time period selection control 1530 is initially set to 30 minutes to match the web content magazine that is ready for reading, as indicated at 1520. However, if the user wants to change the reading time period, the use can use the reading time period selection control 1530. Additional and/or different user-interface controls can be provided for entering the reading time period (e.g., a fill-in field for entering an arbitrary reading time period). In some embodiments, the reading time period control 1530 is not present (e.g., the reading time period is automatically determined, and is not a user-configurable value).

As an example, the example web page user interface 1510 could be generated by a server environment in response to evaluating a user-specific interest model. For example, the user-specific interest model can indicate that the user associated with the user-specific interest model reads news articles for 30 minutes at 10:30 PM each night. In response, the server environment can generate a web content magazine that includes news articles (e.g., selected from the news web sites or news web pages that the user typically reads based on the user's user-specific interest model). The amount of content in the web content magazine can be decided based on the reading time period (e.g., 30 minutes) and the user's reading speed (e.g., the user's reading speed for news content as stored in the user's user-specific interest model). Then, at or close to 10:30 PM, the server environment can present the example web page user interface 1510 to the user for reading the web content magazine. For example, the web content magazine could have been generated ahead-of-time and downloaded to the user's device. In some implementations, the amount of content obtained for the web content magazine can be greater (or less) than the expected amount the user can read within the reading time period. For example, if the user takes a 30-minute bus ride to work in the morning, then additional content may be obtained (e.g., 45-minutes total) so that the use has additional content to read if the user desires or if the bus ride takes longer than normal. Furthermore, additional content may be obtained if the user will be reading offline (e.g., because the user may not have network access to obtain additional content).

Web page user interfaces can be provided for reading web content magazines that include user interface controls other than those depicted in the example web page user interface 1510. For example, user interface controls for selecting topics, online/offline reading mode, and/or other options can be provided.

Figure 16:
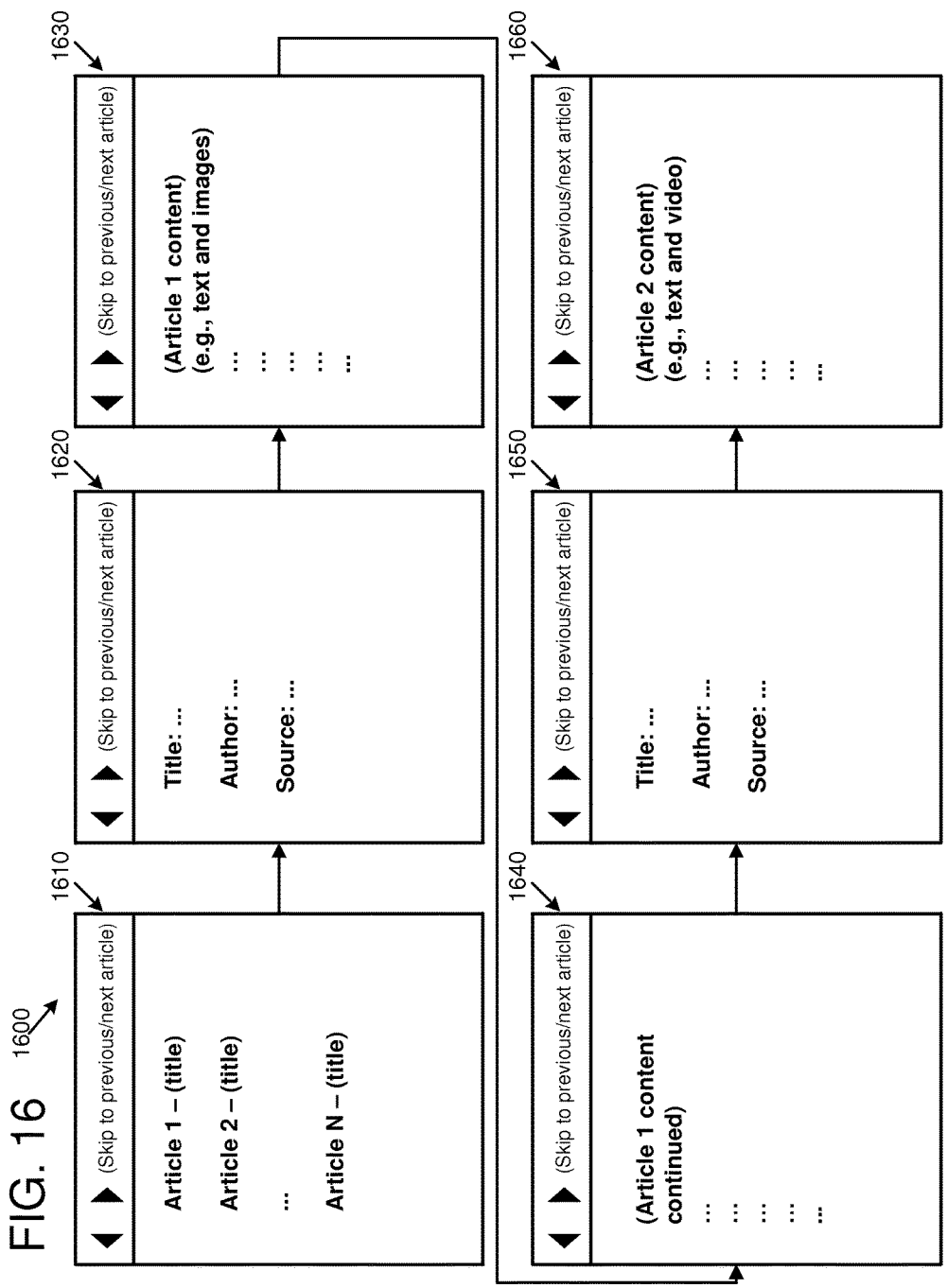
FIG. 16 is a diagram depicting an example web content magazine.

FIG. 16 is a diagram depicting an example web content magazine 1600. The web content magazine 1600 is presented in a simplified format for reading. For example, the simplified format can include extracting the content (e.g., articles and/or other types of content) from various content sources (e.g., web sites, web pages, etc.). For example, a particular article (e.g., the text and images that make up the article content) can be extracted from a news web site that may contain various articles, advertisements, and/or other web page elements that are not part of the article content. The simplified format can present the content in a format that is suitable for reading (e.g., formatted as a magazine or book). Various types of templates can be provided for formatting a web content magazine. For example, different templates can be provided based on the type of content (e.g., a template for primarily text content, a template for primarily video content, a template for mixed content, etc.). Different templates can also be provided based on other criteria, such as based on topic (e.g., different templates can be provided for different topics, such as news, popular press, hobbies, technology, etc.) or platform capabilities (e.g., different templates can be provided for a device that is currently using a WiFi connection versus a device that is currently using a cellular connection). For example, a different format can be provided for a small screen (e.g., a mobile phone) vs. a larger screen (e.g., a tablet) or for a device that supports specific content formats (e.g., multimedia formats, audio or video codec formats, etc.).

The example web content magazine 1600 has been generated from a number of articles (article 1 through N) which may have been extracted from one or more web pages. The first "page" of the web content magazine 1600 is depicted at 1610. The first page lists the articles, and their titles, in the web content magazine. Various navigation options may be provided for navigating between pages and/or articles of the web content magazine (e.g., clicking, swiping, tapping, etc.). While the example web content magazine 1600 is depicted as separate "pages," other formatting may be used such as a single vertically-scrollable view.

The second page of the web content magazine 1600 is depicted at 1620. For example, the user could swipe on a touch display to navigate from the first page 1610 to the second page 1620. The second page displays the title, author, and source (e.g., the particular web page and/or other identifying information from which the article was extracted) of the first article.

The third page of the web content magazine 1600 is depicted at 1630. The third page displays the content (or a portion of the content) for the first article. For example, the first article may contain text and images. The content of the first article may cover one or more pages. In the example web content magazine 1600, the first article spans the third page and the fourth page (depicted at 1640).

The fifth page of the web content magazine 1600 is depicted at 1650. The fifth page displays the title, author, and source of the second article.

The sixth page of the web content magazine 1600 is depicted at 1660. The sixth page displays the content (or a portion of the content) for the second article. For example, the second article may contain text and a video clip (e.g., a video clip that is downloaded and pre-cached or a link to a video clip that is streamed upon accessing the page). The content of the second article may cover one or more pages. The remaining articles of the web content magazine 1600 may be displayed by subsequent pages (not depicted).

In some embodiments, additional meta-data can be provided with the web content magazine 1600. For example, the meta-data can include additional content resources that the user can access related to the content displayed in the magazine. For example, while reading article 1 (e.g., as depicted at 1620), the user could make a selection (e.g., tap on an icon, swipe from the right side of the display, etc.) to display additional articles related to article 1 (e.g., displaying the text of the additional articles and/or providing links that the user can select to navigate to the additional articles).

In some embodiments, the user's response (implicit and/or explicit) to the web content magazine 1600 and/or the content contained within can be determined. For example, if the user spends an expected amount of time reading the article (e.g., time between selecting each page of the article that corresponds to the user's reading speed) then a determination can be made that the user was engaged or enjoyed the article. However, if the user skips or skims the article (e.g., using navigation options or otherwise moves quickly or immediately to the next article), then a determination can be made that user is not interested in the article. The results can be used to modify the user's user-specific interest model (e.g., to adjust which topics are of interest to the user). Explicit indications of interest can also be received (e.g., the user may make an "interested" or "not interested" selection for particular content).

While the example web content magazine 1600 presents a number of articles for reading by the user (e.g., using an article format template intended for content that is primarily text), a web content magazine may contain other types of content. For example, instead of (or in addition to) "articles," the web content magazine can present a collection of audio content, video content, picture content, etc.

In some embodiments, the pages of the web content magazine 1600 are presented in a web browser window where the menus, URL field, and other user interface elements for controlling the web browser application have been removed or hidden. The pages of the web content magazine 1600 can also be provided in by another application (e.g., a custom application for displaying web content). For example, the web content magazine 1600 can be displayed full-screen without an application window border or any menus (e.g., menus may be hidden and accessed when needed) to provide a reading experience where the user can focus on consuming the content without being distracted.

Figure 17:
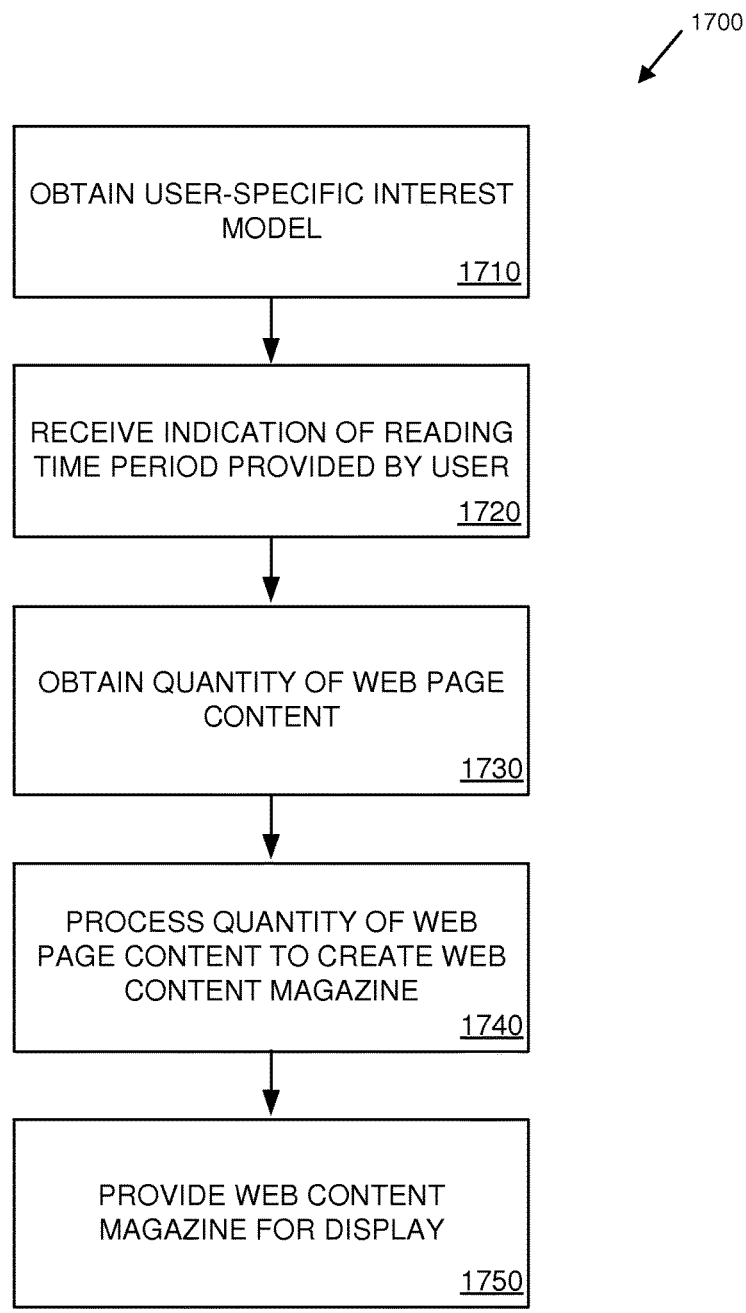
FIGS. 17, 18, and 19 are flow charts of example methods for automatically generating web content magazines.

FIG. 17 is a flow chart of an example method 1700 for automatically generating a web content magazine. For example, the example method 1700 can be performed by the network computing and storage provider 107 described above with regard to FIG. 12 or the server environment 1310 described above with regard to FIG. 13.

At 1710, a user-specific interest model is obtained. The user-specific interest model contains information that is generated from content access history associated with a particular user. For example, the user-specific interest model can be generated from web browsing history, email history, social networking history, etc. The user-specific interest model can comprise information indicating user-based browsing history associated with a user (e.g., web page or web site history, search query history, etc.). The user-specific interest model can comprise information indicating topics of interest to the user (e.g., which topics the user reads most frequently). The user-specific interest model can comprise reading speed information for the user (e.g., the user's average reading speed in words-per-minute, which may be maintained on a per-topic basis).

At 1720, an indication of a reading time period provided by a user is received. For example, the indication can be provided via a web page control (e.g., a selection control such as 1412).

At 1730, a quantity of web page content is obtained that the user can read within the reading time period. For example, the quantity of web page content can reflect an amount that the user can read within the reading time period according to the reading speed information for the user and can also take into account time for listening to audio or watching video. The quantity of web page content can be obtained by extracting one or more portions of web page content from one or more web pages. In some implementations, the user also provides an indication of one or more topics. The one or more topics are then used when obtaining the quantity of web page content (e.g., web page content can be obtained that matches the one or more topics).

At 1740, the quantity of web page content is processed to create a web content magazine. For example, the quantity of web page content can be formatted into a number of "pages" that present the quantity of web page content as a sequence of articles (e.g., as depicted at 1600).

At 1750, the web content magazine is provided for display. For example, the web content magazine can be sent to a client device for display, or the web content magazine can be displayed locally (e.g., by the computing device that performed one or more of 1710, 1720, 1730, and 1740). In some implementations, the web content magazine is provided for offline reading. For example, an indication of user-selection of an offline reading mode can be received, or offline reading mode can be automatically determined. If the offline reading mode used, then the web content magazine can be provided for offline reading by the user.

Figure 18:
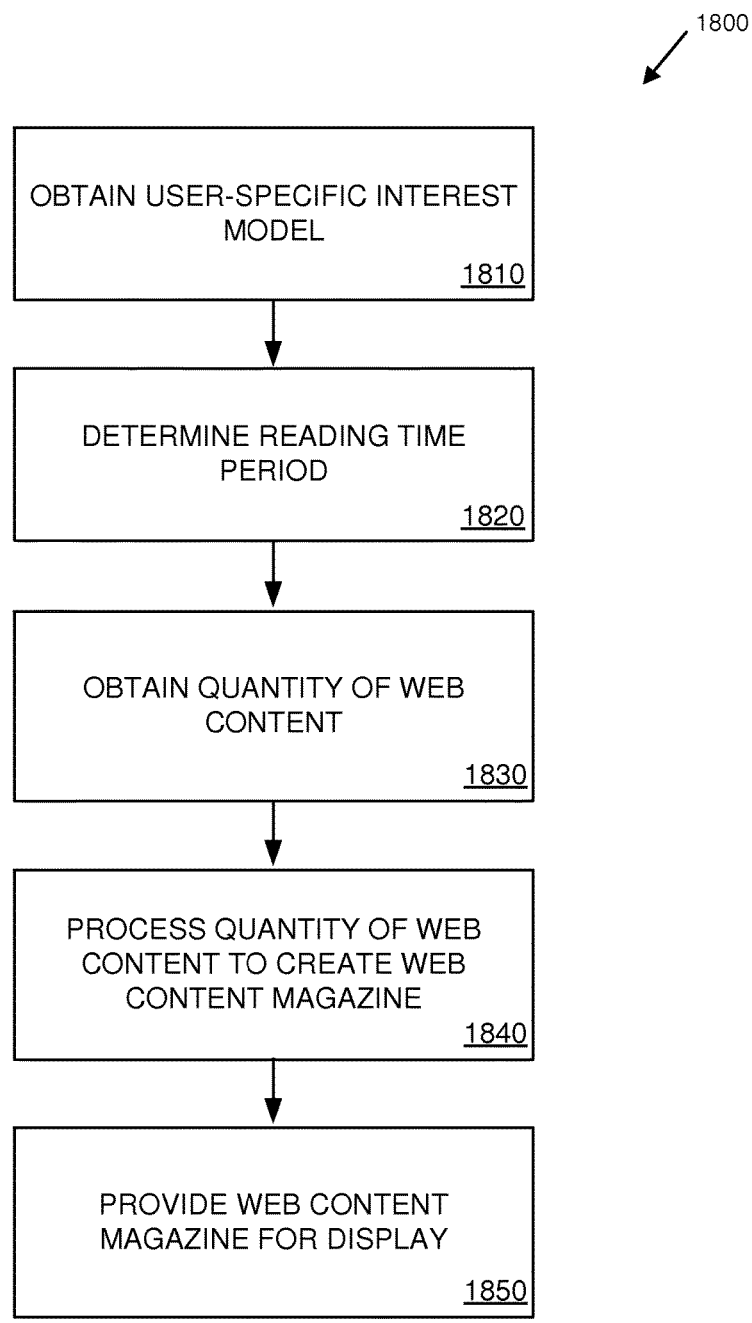

FIG. 18 is a flow chart of an example method 1800 for automatically generating a web content magazine. For example, the example method 1800 can be performed by the network computing and storage provider 107 described above with regard to FIG. 12 or the server environment 1310 described above with regard to FIG. 13.

At 1810, a user-specific interest model is obtained. The user-specific interest model contains information that is generated from content access history associated with a particular user. For example, the user-specific interest model can comprise information indicating user-based browsing history associated with a user (e.g., frequency of access, dwell time, inbound and outbound navigation information, temporal access information, location information, platform information, and/or other information). The user-specific interest model can store information on a per-web source basis (e.g., store information for each of a plurality of web pages, web sites, and/or other types of web resources such as audio and video resources) and/or on an aggregate basis. The user-specific interest model can comprise information indicating topics of interest to the user (e.g., which topics the user reads most frequently). The user-specific interest model can comprise reading speed information for the user (e.g., the user's average reading speed in words-per-minute, which may be maintained on a per-topic basis).

At 1820, a reading time period is determined that is specific to the user. For example, an indication of the reading time period can be received from the user (e.g., via way of a user interface selection of an explicit time period, such as 45 minutes). The reading time period can also be determined automatically (e.g., based on the user-specific interest model that may indicate a specific time period based on the current time and pervious content browsing patterns).

At 1830, a quantity of web content is obtained that the user can read within the reading time period. For example, the quantity of web content can reflect an amount that the user can read within the reading time period according to the reading speed information for the user and can also take into account time for listening to audio or watching video. The quantity of web content can be obtained by extracting one or more portions of web content from one or more web pages. In some implementations, the user also provides an indication of one or more topics. The one or more topics are then used when obtaining the quantity of web content (e.g., web content can be obtained that matches the one or more topics).

At 1840, the quantity of web content is processed to create a web content magazine. For example, the quantity of web content can be formatted into a number of "pages" that present the quantity of web content as a sequence of articles (e.g., as depicted at 1600).

At 1850, the web content magazine is provided for display. For example, the web content magazine can be sent to a client device for display, or the web content magazine can be displayed locally (e.g., by the computing device that performed one or more of 1810, 1820, 1830, and 1840). In some implementations, the web content magazine is provided for offline reading. For example, an indication of user-selection of an offline reading mode can be received, or offline reading mode can be automatically determined. If the offline reading mode used, then the web content magazine can be provided for offline reading by the user.

Figure 19:
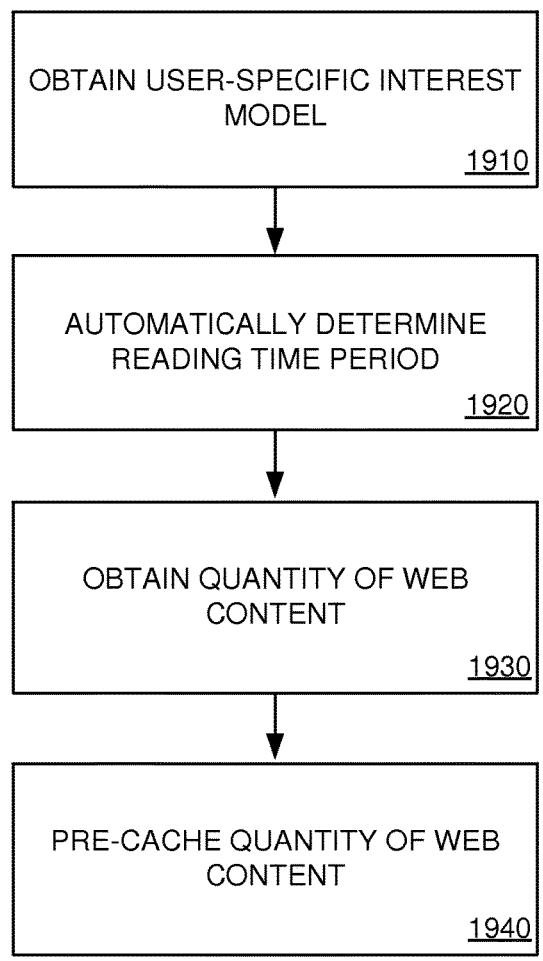

FIG. 19 is a flow chart of an example method 1900 for automatically generating a web content magazine. For example, the example method 1900 can be performed by the network computing and storage provider 107 described above with regard to FIG. 12 or the server environment 1310 described above with regard to FIG. 13.

At 1910, a user-specific interest model is obtained. The user-specific interest model contains information that is generated from content access history associated with a particular user. For example, the user-specific interest model can comprise information indicating user-based browsing history associated with a user (e.g., frequency of access, dwell time, inbound and outbound navigation information, temporal access information, location information, platform information, and/or other information). The user-specific interest model can store information on a per-web source basis (e.g., store information for each of a plurality of web pages, web sites, and/or other types of web resources such as audio and video resources) and/or on an aggregate basis. The user-specific interest model can comprise information indicating topics of interest to the user (e.g., which topics the user reads most frequently). The user-specific interest model can comprise reading speed information for the user (e.g., the user's average reading speed in words-per-minute, which may be maintained on a per-topic basis).

At 1920, a reading time period that is specific to the user is automatically determined based on the user-specific interest model. For example, the user-specific interest model can contain information indicating various reading time periods with their associated browsing patterns. The browsing patterns can be associated with attributes such as time of day, day of the week, specific dates or events, location information, platform information, etc. For example, a time period of 30 minutes can be associated with a browsing pattern of reading news articles from three specific news web sites at 8:30 AM on weekday mornings. As another example, a time period of 3 hours can be associated with a browsing pattern of reading technology and hobby articles the first Monday of every month in offline mode during a business flight.

At 1930, a quantity of web content is obtained that the user can read within the reading time period. For example, the quantity of web content can reflect an amount that the user can read within the reading time period according to the reading speed information for the user and can also take into account time for listening to audio or watching video. The quantity of web content can be obtained by extracting one or more portions of web content from one or more web pages. In some implementations, one or more topics of interest to the user are automatically determined (e.g., based on the user-specific interest model) from which the quantity of web content is selected.

At 1940, the obtained quantity of web content is pre-cached. For example, the quantity of web content can be stored at a server environment (e.g., as web resources in their original format, in a processed state, or in the format of a web content magazine) prior to being provided for display (e.g., prior to being requested or delivered to the user). For example, a server environment can obtain and cache the quantity of web content and generate a web content magazine when needed (e.g., at a time determined from the user-specific interest model or upon user request). In some implementations, a predicted reading time is determined based on the user-specific interest model (e.g., a predicted reading time based on a pattern of browsing history) and at the predicted reading time the pre-cached quantity of web content is processed to generate a web content magazine which is provided for display (e.g., provided to a client device for display).

Figure 20:
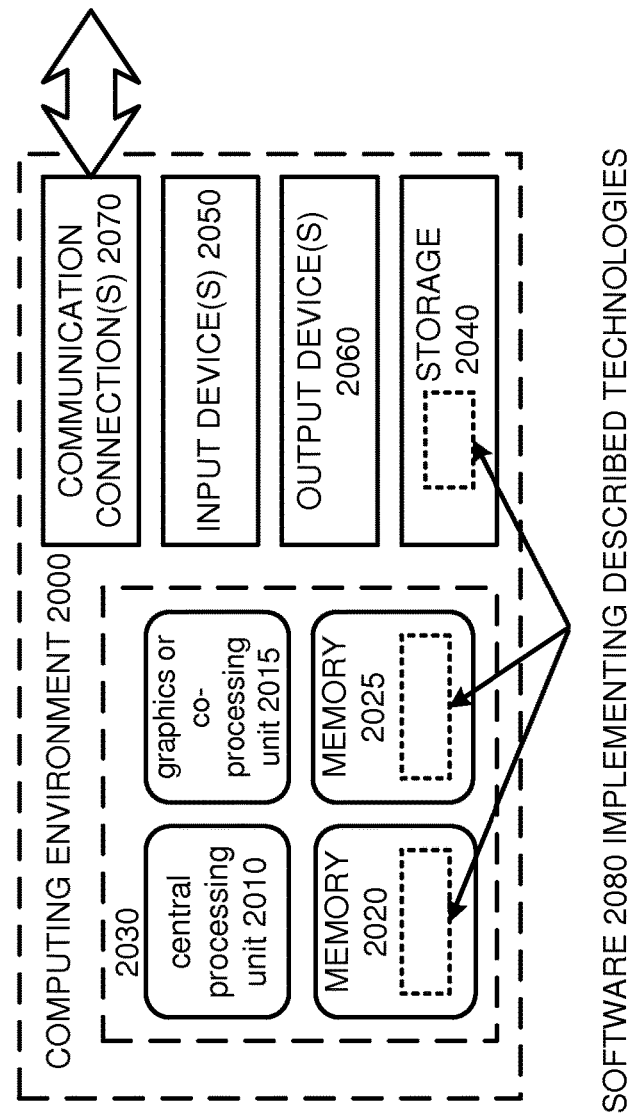
FIG. 20 depicts a generalized example of a suitable computing environment in which the described innovations may be implemented.

FIG. 20 depicts a generalized example of a suitable computing environment 2000 in which the described innovations may be implemented. The computing environment 2000 is not intended to suggest any limitation as to scope of use or functionality, as the innovations may be implemented in diverse general-purpose or special-purpose computing systems. For example, the computing environment 2000 can be any of a variety of computing devices (e.g., desktop computer, laptop computer, server computer, tablet computer, smart phone, etc.)

With reference to FIG. 20, the computing environment 2000 includes one or more processing units 2010, 2015 and memory 2020, 2025. In FIG. 20, this basic configuration 2030 is included within a dashed line. The processing units 2010, 2015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s). The memory 2020, 2025 stores software 2080 implementing one or more innovations described herein, in the form of computer-executable instructions suitable for execution by the processing unit(s).

A computing system may have additional features. For example, the computing environment 2000 includes storage 2040, one or more input devices 2050, one or more output devices 2060, and one or more communication connections 2070. An interconnection mechanism (not shown) such as a bus, controller, or network interconnects the components of the computing environment 2000. Typically, operating system software (not shown) provides an operating environment for other software executing in the computing environment 2000, and coordinates activities of the components of the computing environment 2000.

The tangible storage 2040 may be removable or non-removable, and includes magnetic disks, magnetic tapes or cassettes, CD-ROMs, DVDs, or any other medium which can be used to store information in a non-transitory way and which can be accessed within the computing environment 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing environment 2000. The output device(s) 2060 may be a display, printer, speaker, CD-writer, or another device that provides output from the computing environment 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a network computing and storage provider, for automatically generating a web content magazine, the method comprising:
  obtaining a user-specific interest model comprising:
    information indicating user-based browsing history associated with a user; and
    reading speed information specific to the user;
  receiving, from the user via a user interface, an indication of a reading time period provided by the user;
  determining a predicted reading time based on the user-specific interest model; and
  automatically, prior to the predicted reading time, and before a web content magazine is requested by the user:
    obtaining a quantity of web page content that can be read by the user within the reading time period, wherein the quantity of web page content reflects an amount that the user can read within the reading time period according to the reading speed information specific to the user, wherein obtaining the quantity of web page content comprises:
- determining whether the user will be offline during the reading time period;
- based on determining that the user will be offline, adding an additional amount of time to the reading time period provided by the user, wherein the additional amount of time is added automatically and is not provided by the user; and
- obtaining an additional amount of content corresponding to the additional amount of time, wherein the quantity of web page content that includes the additional amount of content reflects more than an amount of content that the user can read within the reading time period provided by the user;

processing the quantity of web page content to generate the web content magazine; and providing the web content magazine to a computing device associated with the user to display the web content magazine at the predicted reading time.

2. The method of claim 1 wherein the information indicating user-based browsing history comprises information for each of a plurality of web sources comprising:
- frequency of access of the web source;
- dwell time for the web source;
- inbound and outbound navigation information for the web source;
- temporal access information for the web source; and
- topic information for the web source.

3. The method of claim 1 further comprising:
- receiving an indication of one or more topics provided by the user, wherein the quantity of web page content is selected according to the one or more topics.

4. The method of claim 1 wherein the reading speed information for the user comprises, for each topic of a plurality of topics:
- a reading speed for the user that is specific to the topic.

5. The method of claim 1 wherein obtaining the quantity of web page content comprises:
- extracting one or more portions of web page content from one or more web pages;
- wherein processing the quantity of web page content comprises formatting the extracted one or more portions of web content.

6. The method of claim 1 further comprising:
- receiving an indication of an offline reading mode selected by the user;
- wherein the web content magazine is provided for display at the computing device in the offline reading mode, wherein the web content magazine is available to the user for reading offline.

7. The method of claim 1 wherein processing the quantity of web page content to generate the web content magazine comprises:
- formatting the quantity of web page content into a format for reading using a selected template based on a type of the web page content, the template selected from available templates comprising: a template for text content, a template for video content, and a template for mixed content.

8. A computing device comprising:
a processing unit; and
a network interface;
the processing unit executing computer instructions that perform operations to automatically generate a set of content pages, the operations comprising:
- obtaining a user-specific interest model comprising information indicating user-based browsing history associated with a user;
- determining a reading time period that is specific to the user, wherein the reading time period is provided by the user via a user interface;
- determining a predicted reading time based on the user-specific interest model;
- obtaining a quantity of web content that can be read by the user within the reading time period, wherein obtaining the quantity of web page content comprises:
  - determining whether the user will be offline during the reading time period;
  - based on determining that the user will be offline, adding an additional amount of time to the reading time period specific to the user, wherein the additional amount of time is added automatically and is not provided by the user; and
  - obtaining an additional amount of content corresponding to the additional amount of time, wherein the quantity of web page content that includes the additional amount of content reflects more than an amount of content that the user can read within the reading time period specific to the user;
- processing the quantity of web content to generate a set of content pages; and
- providing the set of content pages to display to the user at the predicted reading time.

9. The computing device of claim 8 wherein determining the reading time period comprises:
- receiving an indication of the reading time period provided by the user.

10. The computing device of claim 8 wherein determining the reading time period comprises:
- automatically determining the reading time period based, at least in part, on the user-specific interest model.

11. The computing device of claim 8 wherein obtaining the quantity of web content comprises:
- extracting one or more portions of web content from one or more web sources;
- wherein processing the quantity of web content comprises formatting the extracted one or more portions of web content.

12. The computing device of claim 8 wherein obtaining the quantity of web content that can be read by the user within the reading time period comprises:
- identifying a reading speed for the user;
- wherein the quantity of web content reflects an amount that the user can read within the reading time period according to the reading speed for the user.

13. The computing device of claim 8, the operations further comprising:
- determining one or more topics of interest to the user based, at least in part, on the user-specific interest model, wherein the quantity of web page content is selected according to the determined one or more topics.

14. The computing device of claim 8 wherein the information indicating user-based browsing history comprises information for each of a plurality of web sources comprising:

frequency of access of the web source;
dwell time for the web source;
inbound and outbound navigation information for the web source;
temporal access information for the web source; and
topic information for the web source.

15. The computing device of claim 8 wherein the set of content pages is an ordered set of content pages, wherein the set of content pages is provided for display at a client computing device in an offline mode in which the set of content pages is available to the user for reacting offline.

16. A computer-readable storage medium storing computer-executable instructions for causing a computing device to perform operations for automatically generating a web content magazine, the operations comprising:
    obtaining a user-specific interest model comprising information indicating user-based browsing history associated with a user;
    determining a reading time period that is specific to the user, wherein the reading time period is provided by the user via a user interface;
    determining a predicted reading time based on the user-specific interest model;
    obtaining a quantity of web content that can be read by the user within the reading time period, wherein obtaining the quantity of web page content comprises:
    determining whether the user will be offline during the reading time period;
    based on determining that the user will be offline, adding an additional amount of time to the reading time period specific to the user, wherein the additional amount of time is added automatically and is not provided by the user; and
    obtaining an additional amount of content corresponding to the additional amount of time, wherein the quantity of web page content that includes the additional amount of content reflects more than an amount of content that the user can read within the reading time period specific to the user; and
    pre-caching the quantity of web content for providing to the user as a web content magazine; and
    prior to the predicted reading time:
        processing the pre-cached quantity of web content to generate the web content magazine; and
        providing the web content magazine to display the web content magazine at the predicted reading time.

17. The computer-readable storage medium of claim 16 wherein the user-specific interest model comprises reading speed information for the user.

18. The computer-readable storage medium of claim 16 wherein the method is performed automatically at a time determined from the user-specific interest model before the web content magazine is requested by the user.

19. The computer-readable storage medium of claim 16 wherein obtaining the quantity of web content that can be read by the user within the reading time period comprises:
    identifying a reading speed for the user;
    wherein the quantity of web content reflects an amount that the user can read within the reading time period according to the reading speed for the user.

20. The computer-readable storage medium of claim 16, the operations further comprising:
    determining one or more topics of interest to the user based, at least in part, on the user-specific interest model, wherein the quantity of web page content is selected according to the determined one or more topics.

* * * * *